(12) United States Patent
Yoneyama et al.

(10) Patent No.: US 8,992,355 B2
(45) Date of Patent: Mar. 31, 2015

(54) ARTIFICIAL FEATHER FOR SHUTTLECOCK, SHUTTLECOCK, AND METHOD OF MANUFACTURING ARTIFICIAL FEATHER FOR SHUTTLECOCK

(75) Inventors: Wataru Yoneyama, Saitama (JP); Kensuke Tanaka, Saitama (JP); Seiya Miyazaki, Saitama (JP)

(73) Assignee: Yonex Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/817,823

(22) PCT Filed: Aug. 18, 2011

(86) PCT No.: PCT/JP2011/068701
§ 371 (c)(1),
(2), (4) Date: Apr. 26, 2013

(87) PCT Pub. No.: WO2012/023587
PCT Pub. Date: Feb. 23, 2012

(65) Prior Publication Data
US 2013/0225339 A1    Aug. 29, 2013

(30) Foreign Application Priority Data
Aug. 20, 2010 (JP) .................................. 2010-185217

(51) Int. Cl.
A63B 67/18 (2006.01)
B29C 45/00 (2006.01)
B29C 45/16 (2006.01)

(52) U.S. Cl.
CPC ............ *A63B 67/18* (2013.01); *A63B 2209/00* (2013.01); *B29C 45/0003* (2013.01); *A63B 2243/0087* (2013.01); *B29C 45/1676* (2013.01)
USPC .......................................................... 473/580

(58) Field of Classification Search
USPC .................................................. 473/579, 580
See application file for complete search history.

(56) References Cited

U.S. PATENT DOCUMENTS 3,831,943 A * 8/1974 Popplewell .................... 473/579
4,305,589 A * 12/1981 Popplewell .................... 473/579
2010/0311526 A1* 12/2010 Tanaka .......................... 473/579

FOREIGN PATENT DOCUMENTS

CN 200954364 Y 10/2007
GB 949110 A 2/1964

(Continued)

OTHER PUBLICATIONS

Extended European Search Report issued in European Application No. 11818228.6 mailed Jul. 1, 2014.

(Continued)

*Primary Examiner* — John Ricci
(74) *Attorney, Agent, or Firm* — McDermott Will & Emery LLP

(57) ABSTRACT

An artificial feather for a shuttlecock including a vane portion in a thin film form, corresponding to a vane, and a rachis portion in a bar form extending integrally and continuously from an upper tip end to a lower distal end, corresponding to a rachis, to imitate a natural feather, the vane portion being made of thermoplastic resin having interconnecting bubbles therein, and having low specific gravity and low elasticity relative to the rachis portion, the rachis portion being made of thermoplastic resin being fixed to the vane portion at a vane support portion, having the vane support portion set as an area that is fixed to the vane portion along the tip end to a bottom end of the vane portion, and having a calamus portion set as an area that protrudes to a lower side of the vane portion and spans from a bottom end of the vane support portion to the distal end, to correspond to a calamus of the natural feather.

7 Claims, 21 Drawing Sheets

(56) References Cited

FOREIGN PATENT DOCUMENTS

| | | |
|---|---|---|
| GB | 2 096 473 A | 10/1982 |
| JP | 53-25466 | 3/1978 |
| JP | 53-040335 A | 4/1978 |
| JP | 54-103978 | 7/1979 |
| JP | 57-177782 A | 11/1982 |
| JP | 59-069086 A | 4/1984 |
| JP | 8-098908 A | 4/1996 |
| JP | 2005-278784 A | 10/2005 |
| JP | 2008-206970 A | 9/2008 |
| WO | 2010/029914 A1 | 3/2010 |

OTHER PUBLICATIONS

Chinese Office Action issued in Chinese Application No. 201180040381.0 dated Jun. 5, 2014, with English translation.
International Search Report issued in International Application No. PCT/JP2011/068701 mailed on Nov. 22, 2011.

* cited by examiner

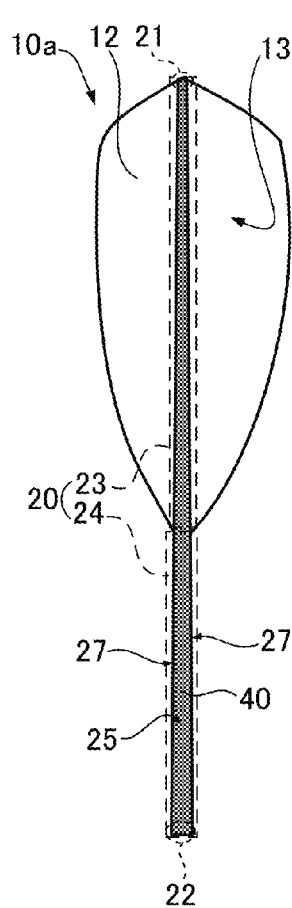 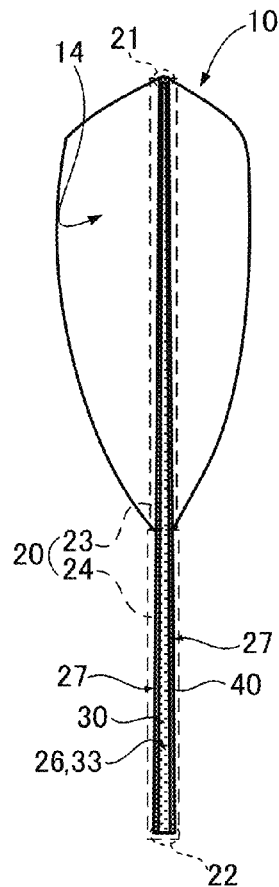 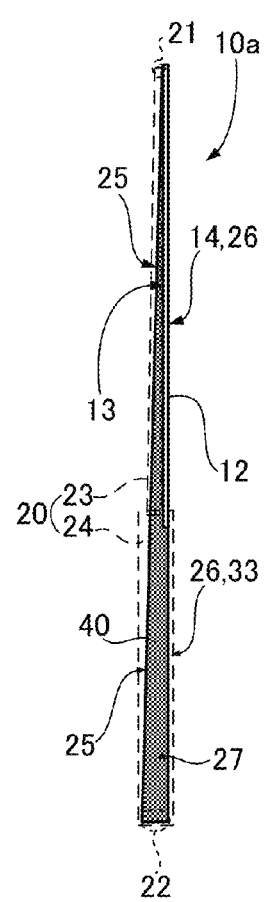
FIG. 8A  FIG. 8B  FIG. 8C
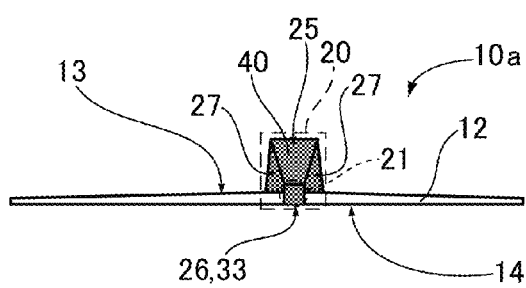
FIG. 8D

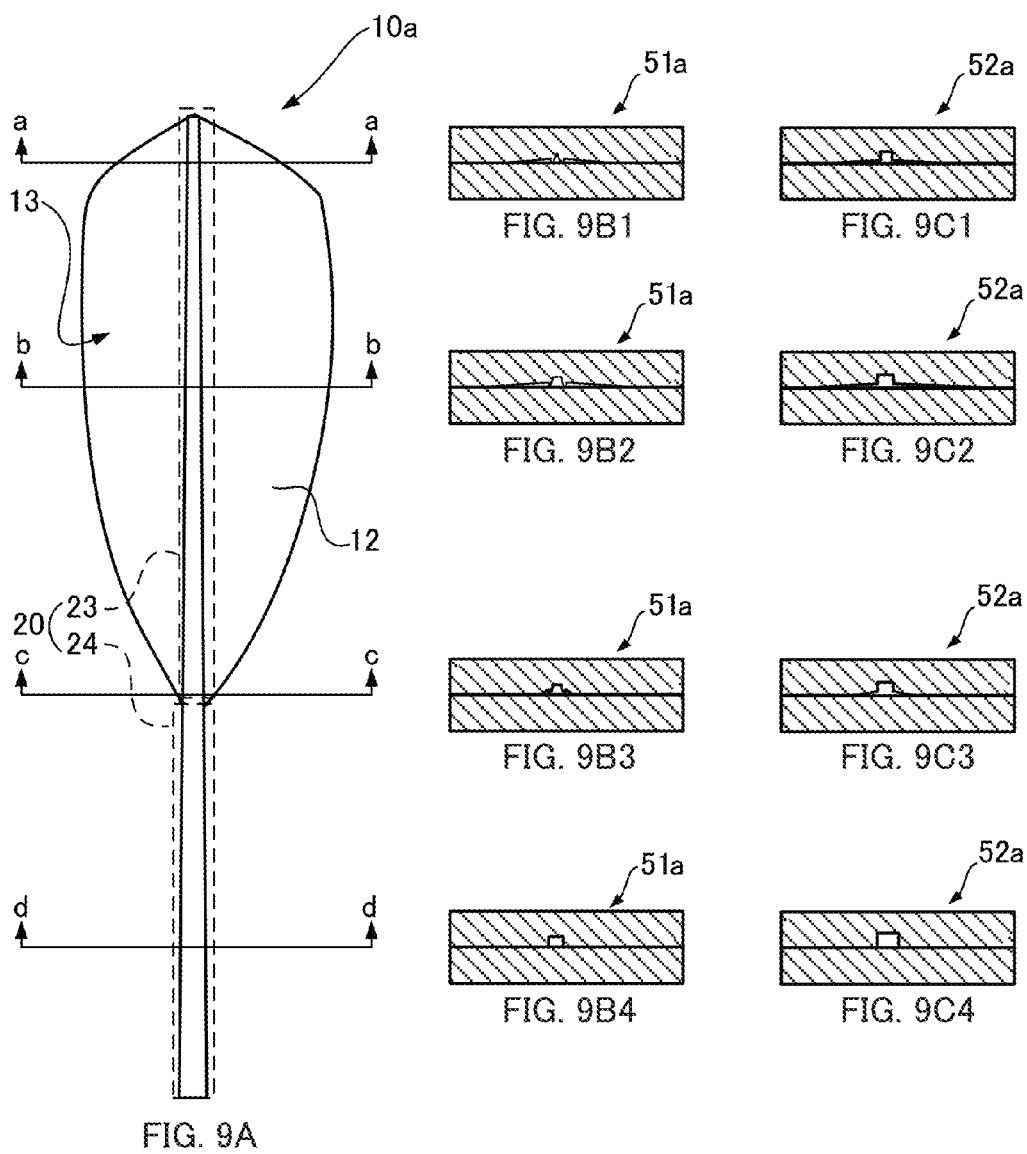

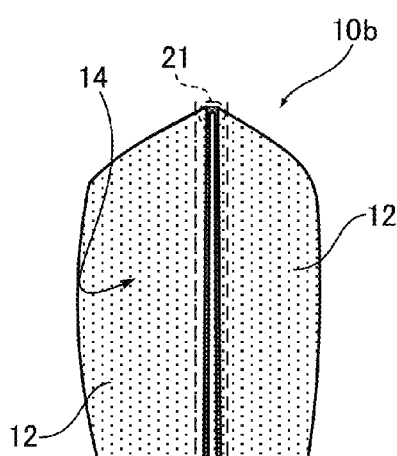
FIG. 12B
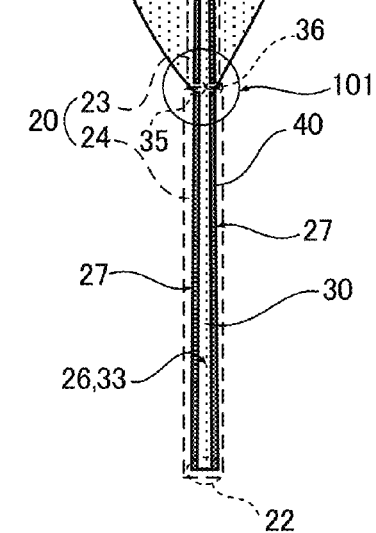
FIG. 12A
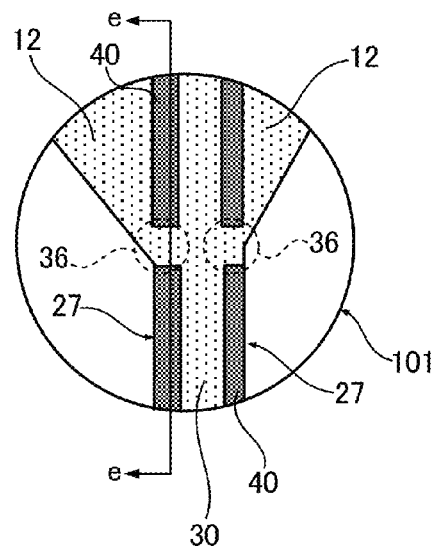
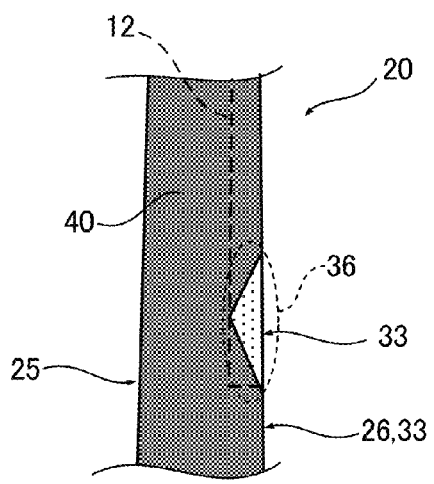
FIG. 12C

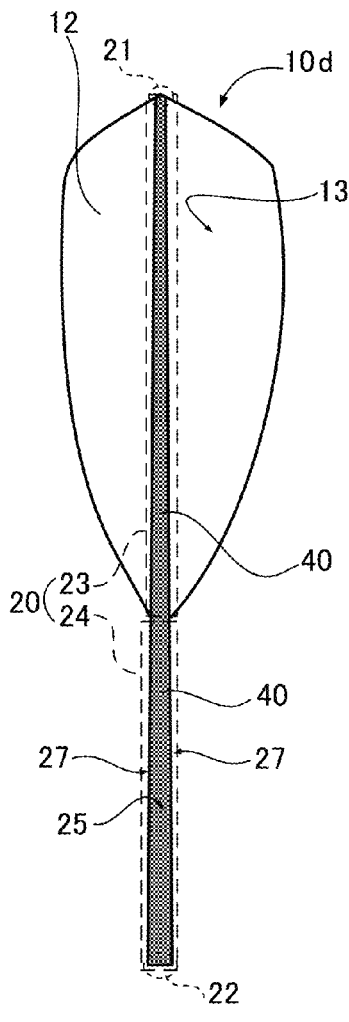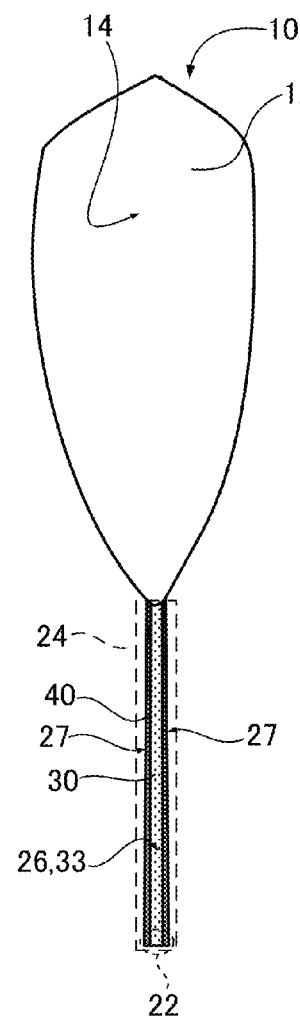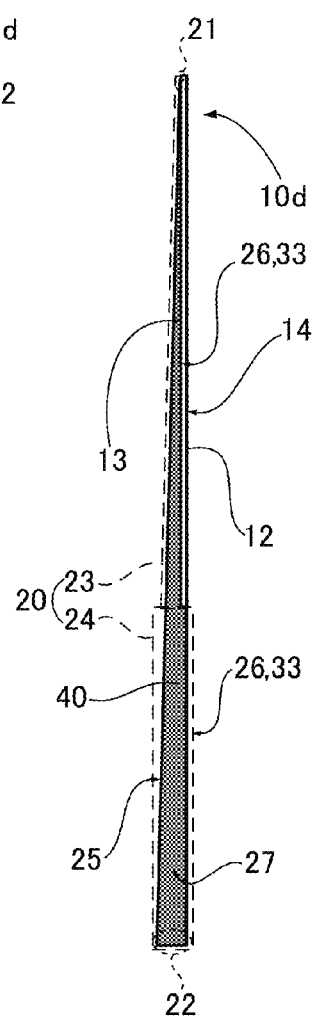
FIG. 14A      FIG. 14B      FIG. 14C
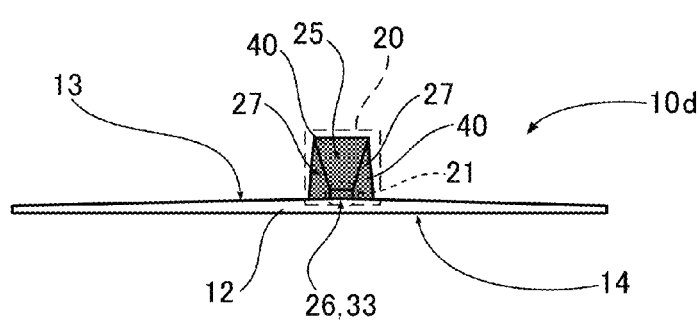
FIG. 14D

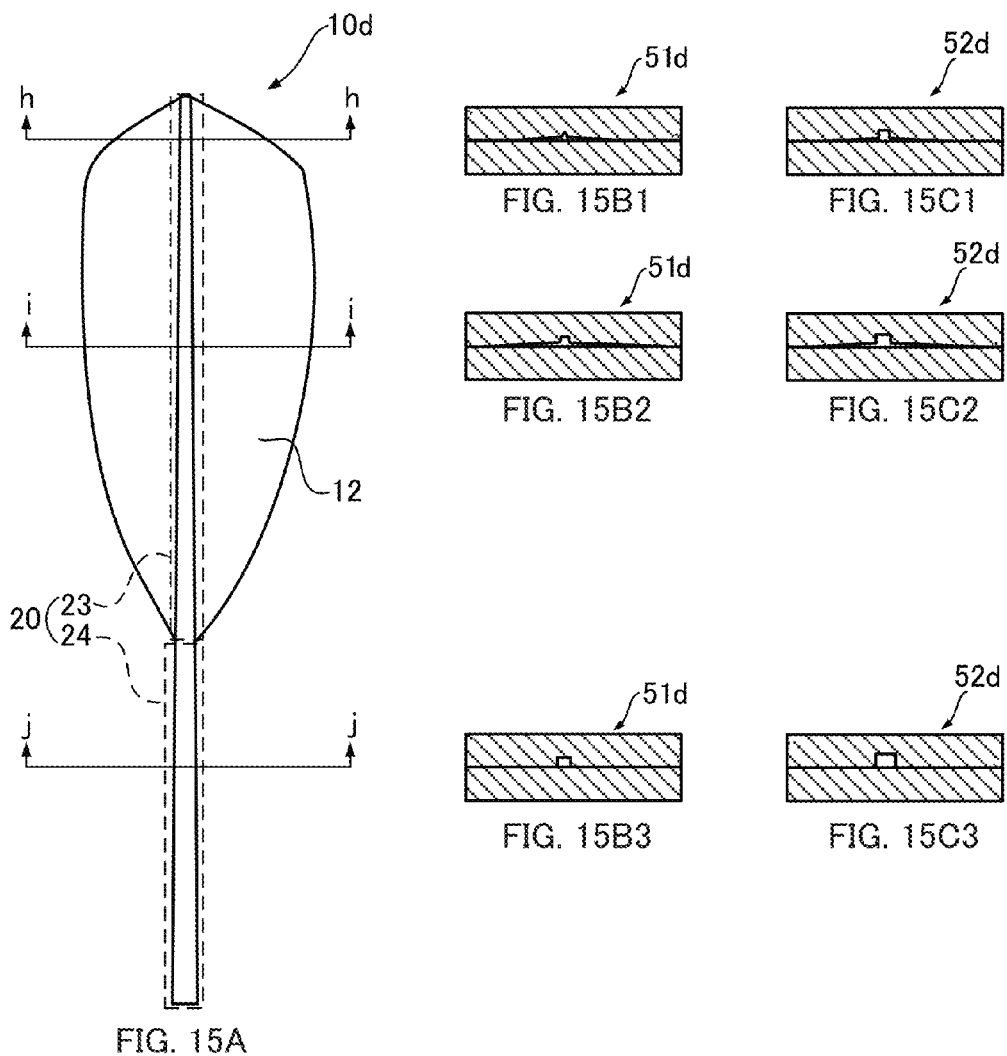

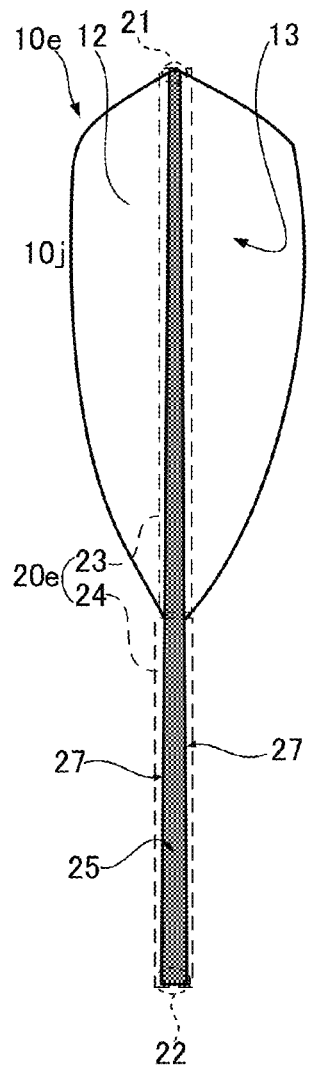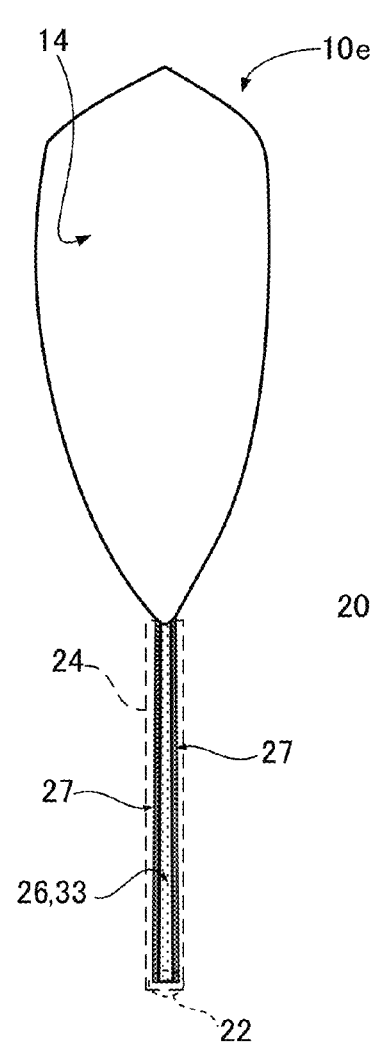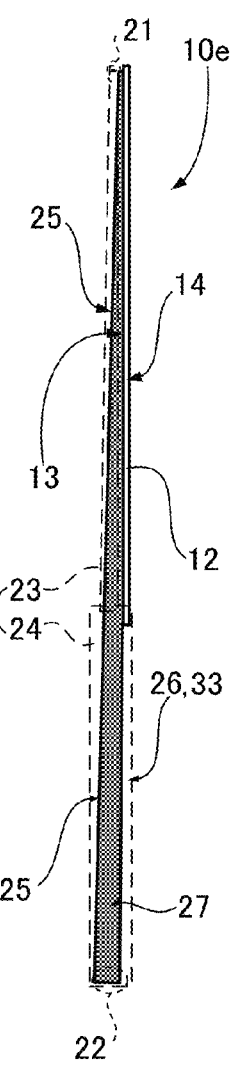
FIG. 17A  FIG. 17B  FIG. 17C
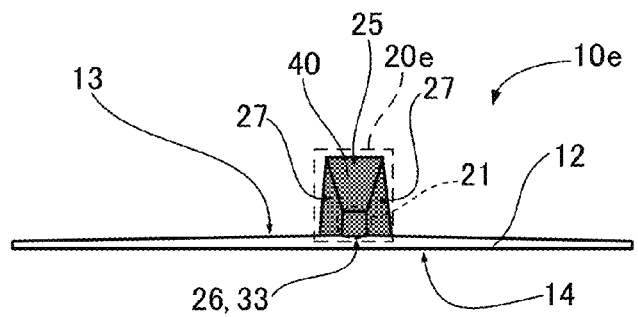
FIG. 17D

ARTIFICIAL FEATHER FOR SHUTTLECOCK, SHUTTLECOCK, AND METHOD OF MANUFACTURING ARTIFICIAL FEATHER FOR SHUTTLECOCK

RELATED APPLICATIONS

This application is the U.S. National Phase under 35 U.S.C. §371 of International Application No. PCT/JP2011/068701, filed on Aug. 18, 2011, which in turn claims the benefit of Japanese Application No. 2010-185217, filed on Aug. 20, 2010, the disclosures of which Applications are incorporated by reference herein.

TECHNICAL FIELD

The present invention relates to artificial feather for badminton shuttlecocks. Specifically, the present invention relates to a technology for improving the vane portion in a thin film form of the artificial feather. Further, the present invention relates to shuttlecocks using artificial feather and a method of manufacturing artificial feather.

BACKGROUND ART

As badminton shuttlecocks, there are those using waterfowl feather (natural feather shuttlecocks) and those using artificial feather (artificial feather shuttlecocks) artificially manufactured using nylon resin and the like, for the feathers.

As is well known, natural feather shuttlecocks have a structure using approximately 16 natural feathers of geese, ducks or the like, and the ends of the stems of the feathers are embedded into the hemispherical platform (base portion) made of cork covered with skin. And the feather used for natural feather shuttlecocks have a feature of the specific gravity being small and being extremely light. For example, the specific gravity of the stem portion is approximately 0.4 and the vane portion is approximately 0.15. Additionally, natural feather has high rigidity and thereby a unique flying performance and comfortable impression when hitting natural feather shuttlecocks can be perceived.

However, the feather used as the material for natural feather shuttlecocks are collected from the aforementioned natural waterfowls and moreover, feathers of specific portions of the waterfowl are suitable for shuttlecocks which does not mean that feathers from any portion of the waterfowl can be used and thus the amount of feather for a shuttlecock that can be collected from one waterfowl is a miniscule number. In other words, there is a limit to the amount of feather manufactured for use in natural feather shuttlecocks. Further, there has been a situation of a large amount of geese used for food that had been the main source for feather, being disposed due to bird flu epidemic in the recent years. Therefore, material procurement is predicted to become more difficult and the price of natural feather shuttlecocks to rise further in the future.

Meanwhile, shuttlecocks with resin feather integrally formed in a ring shape is well known as artificial feather shuttlecocks, however, the feathers of these artificial feather shuttlecocks do not move independently as with natural feather shuttlecocks so that flight performance similar to natural feather shuttlecocks is difficult to be achieved. For such reason, artificial feather shuttlecocks imitating feather has been proposed as described in the following PTL 1 through 3.

Here, when correspondence between portions of natural feather and portions of artificial feather based on ornithology is made, the portions corresponding to the vane and the rachis of natural feather will be called vane portion and the rachis portion, respectively, the portions corresponding to those called the basal and the calamus that protrude from the vane as a part of the rachis will be called the calamus portion to avoid confusion with feather. With such preconditions, the artificial feather described in PTL 1 has the vane portion and the rachis portion integrally formed with artificial material and the weight is reduced by making at least one of the vane portion the rachis portion hollow. Further, the artificial feather described in PTL 2 has a structure of the vane portion made from thin plated fiber dispersed resin sandwiched by two thin fiber-reinforced resin rods being the rachis portions while the basal portion of the rachis portions has a foam body inserted between the two thin rods. In the artificial feather described in PTL 3, a protruding portion is formed to protrude in the extending direction of the rachis portion at one end of the vane portion and the protruding portion is embedded in the rachis portion.

CITATION LIST

Patent Literature

[PTL 1]
Japanese Patent Application Laid-open Publication No. 8-98908
[PTL 2]
Japanese Patent Application Laid-open Publication No. 59-69086
[PTL 3]
Japanese Patent Application Laid-open Publication No. 2008-206970

SUMMARY OF INVENTION

Technical Problem

Artificial feather for shuttlecocks require to be equipped with various performances such as hitting impression and flying performance similar to those of natural feather. Particularly, the vane portion constitutes almost the whole area of a single artificial feather so that making the characteristics of the vane portion closely resemble those of natural feather is the most important subject.

To be specific, vanes of natural feather used for natural feather shuttlecocks are a collective of relatively stiff feather (barbs) each growing from the rachis. And because of this structure, natural feather although being thin and light, is impact-resistant absorbing impact when hit, and the vane has appropriate rigidity (shape retainability) that does not easily deform even when flying through the air at high speed.

Therefore, it is required to make studies from various perspectives on a wide variety of conditions including material, as a matter of course, microscopic structure and the like for allowing the vane portion of artificial feather to develop the aforementioned characteristics. However, it is extremely difficult to satisfy all these conditions, for example, it is difficult to reduce the weight and thickness, and be impact-resistant at the same time. For such reason, conventional artificial feather implemented high-priority in reducing the weight by using mainly sheet-form resin. It is a matter of course that the fundamental problem of natural feather shuttlecocks being expensive as described above cannot be solved if the manufacturing cost of artificial feather is increased in order to achieve natural feather-like characteristics. That is, artificial feather has, in addition to the subject of imitating flying characteristics of shuttlecocks, a subject of easy manufacturing that natural feather does not have.

And although the above-mentioned patent literatures mention to some extent on the material of the vane portion, the details thereof are not described nor suggested so that there is a question about whether or not characteristics similar to natural feather can be achieved. Additionally, the artificial feather described in the above-mentioned patent literatures have various problems not only problems relating to the material of the vane portion. For example, the artificial feather described in the above-mentioned PTL 1 has formed a hollow portion that crosses vertically through the thin vane portion and the thin rachis portion. However, being an integrally molded product, an extremely thin pin is penetrated through and pulled out in a mold to form the hollow portion. Therefore, accurate molding is difficult and there is a concern that the pin would deform by penetrating and pulling out the pin. In addition, the thickness of the vane portion needs to be reduced for a further reduction of the weight but this would reduce the strength of the vane portion in the plane direction so that enough shape retainability cannot be achieved. Thus it is difficult to achieve flying performance and a hitting impression alike natural feather shuttlecocks with an artificial feather shuttlecock using this artificial feather. It is a matter of course that the strength of the rachis itself would be insufficient when the rachis is hollow even when the material itself of the rachis portion is rigid, causing possibility of the rachis breaking and bending when being hit hard.

The artificial feather described in PTL 2 is structured with two thin bars forming the rachis portion sandwiching and being adhered to the vane portion, and therefore sufficient adhesive strength between the thin bars and the vane portion cannot be achieved creating a possibility of the vane portion and the rachis portion coming apart when being hit. Further, since the rachis portion is structured by having the thin bars adhered together so that the faces that are adhered, that is, the side faces of the rachises lacking strength cannot exhibit sufficient rigidity. There is also a question of low productivity and lack of effect in keeping the cost low since integral molding cannot be performed in manufacturing.

The artificial feather described in PTL 3 has a part of the thin vane portion made of such as nonwoven fabric, in a form protruding along the rachis with the protruded portion (protrusion) embedded in the rachis portion. Therefore, reduction in weight of the vane portion is performed by reducing the thickness of the vane portion since the vane portion relies on the specific gravity of the material itself. Therefore, it is difficult to reduce the weight and increase impact-resistance at the same time.

The present invention has been made in view of the aforementioned various problems that conventional artificial feather for shuttlecocks have and an object there of is to provide artificial feather for shuttlecocks that are lightweight, having excellent shape retainability, of the vane portion in particular, and having excellent durability and productivity, and shuttlecocks using the artificial feather, and a method of manufacturing the artificial feather. Note that, other objectives will become apparent from the following description.

Solution to Problem

The present invention has been made in view of the above-mentioned problems of artificial feather for shuttlecocks and a principal aspect of the invention is, an artificial feather for a shuttlecock including a vane portion in a thin film form, corresponding to a vane, and a rachis portion in a bar form extending integrally and continuously from an upper tip end to a lower distal end, corresponding to a rachis, to imitate a natural feather, the vane portion being made of thermoplastic resin having interconnecting bubbles therein, and having low specific gravity and low elasticity relative to the rachis portion, the rachis portion being made of thermoplastic resin being fixed to the vane portion at a vane support portion, having the vane support portion set as an area that is fixed to the vane portion along the tip end to a bottom end of the vane portion, and having a calamus portion set as an area that protrudes to a lower side of the vane portion and spans from a bottom end of the vane support portion to the distal end, to correspond to a calamus of the natural feather.

Advantageous Effects of Invention

Artificial feathers for shuttlecocks according to the present invention are lightweight and have excellent shape retainability, and the shuttlecocks using the artificial feathers can be expected to exhibit flying performance and hitting impression similar to natural feather shuttlecocks. Further, provision of shuttlecocks with excellent productivity and of inexpensive price is possible without relying on the amount of production of natural material. Further, the other effects of the present invention will become apparent from the following description.

BRIEF DESCRIPTION OF DRAWINGS

FIG. 8A is a view showing the structure of the artificial feather according to the third embodiment of the present invention.

FIG. 8B is a view showing the structure of the artificial feather according to the third embodiment of the present invention.

FIG. 8C is a view showing the structure of the artificial feather according to the third embodiment of the present invention.

FIG. 8D is a view showing the structure of the artificial feather according to the third embodiment of the present invention.

FIG. 9A is a diagram schematically showing the manufacturing method of an artificial feather according to the aforementioned third embodiment.

FIG. 9B1 is a diagram schematically showing the manufacturing method of an artificial feather according to the aforementioned third embodiment.

FIG. 9B2 is a diagram schematically showing the manufacturing method of an artificial feather according to the aforementioned third embodiment.

FIG. 9B3 is a diagram schematically showing the manufacturing method of an artificial feather according to the aforementioned third embodiment.

FIG. 9B4 is a diagram schematically showing the manufacturing method of an artificial feather according to the aforementioned third embodiment.

FIG. 9C1 is a diagram schematically showing the manufacturing method of an artificial feather according to the aforementioned third embodiment.

FIG. 9C2 is a diagram schematically showing the manufacturing method of an artificial feather according to the aforementioned third embodiment.

FIG. 9C3 is a diagram schematically showing the manufacturing method of an artificial feather according to the aforementioned third embodiment.

FIG. 9C4 is a diagram schematically showing the manufacturing method of an artificial feather according to the aforementioned third embodiment.

FIG. 12A is a diagram for explaining a problem of the artificial feather according to the aforementioned third embodiment.

FIG. 12B is a diagram for explaining a problem of the artificial feather according to the aforementioned third embodiment.

FIG. 12C is a diagram for explaining a problem of the artificial feather according to the aforementioned third embodiment.

FIG. 14A is a view showing the structure of the artificial feather according to the fourth embodiment of the present invention.

FIG. 14B is a view showing the structure of the artificial feather according to the fourth embodiment of the present invention.

FIG. 14C is a view showing the structure of the artificial feather according to the fourth embodiment of the present invention.

FIG. 14D is a view showing the structure of the artificial feather according to the fourth embodiment of the present invention.

FIG. 15A is a diagram schematically showing the manufacturing method of an artificial feather according to the aforementioned fourth embodiment.

FIG. 15B1 is a diagram schematically showing the manufacturing method of an artificial feather according to the aforementioned fourth embodiment.

FIG. 15B2 is a diagram schematically showing the manufacturing method of an artificial feather according to the aforementioned fourth embodiment.

FIG. 15B3 is a diagram schematically showing the manufacturing method of an artificial feather according to the aforementioned fourth embodiment.

FIG. 15C1 is a diagram schematically showing the manufacturing method of an artificial feather according to the aforementioned fourth embodiment.

FIG. 15C2 is a diagram schematically showing the manufacturing method of an artificial feather according to the aforementioned fourth embodiment.

FIG. 15C3 is a diagram schematically showing the manufacturing method of an artificial feather according to the aforementioned fourth embodiment.

FIG. 17A is a diagram showing an external configuration of the artificial feather according to another embodiment of the present invention that has a reverse side of the vane portion and a reverse side of the rachis portion on a different plane.

FIG. 17B is a diagram showing an external configuration of the artificial feather according to another embodiment of the present invention that has a reverse side of the vane portion and a reverse side of the rachis portion on a different plane.

FIG. 17C is a diagram showing an external configuration of the artificial feather according to another embodiment of the present invention that has a reverse side of the vane portion and a reverse side of the rachis portion on a different plane.

FIG. 17D is a diagram showing an external configuration of the artificial feather according to another embodiment of the present invention that has a reverse side of the vane portion and a reverse side of the rachis portion on a different plane.

MODE FOR CARRYING OUT THE INVENTION

Figure 1:
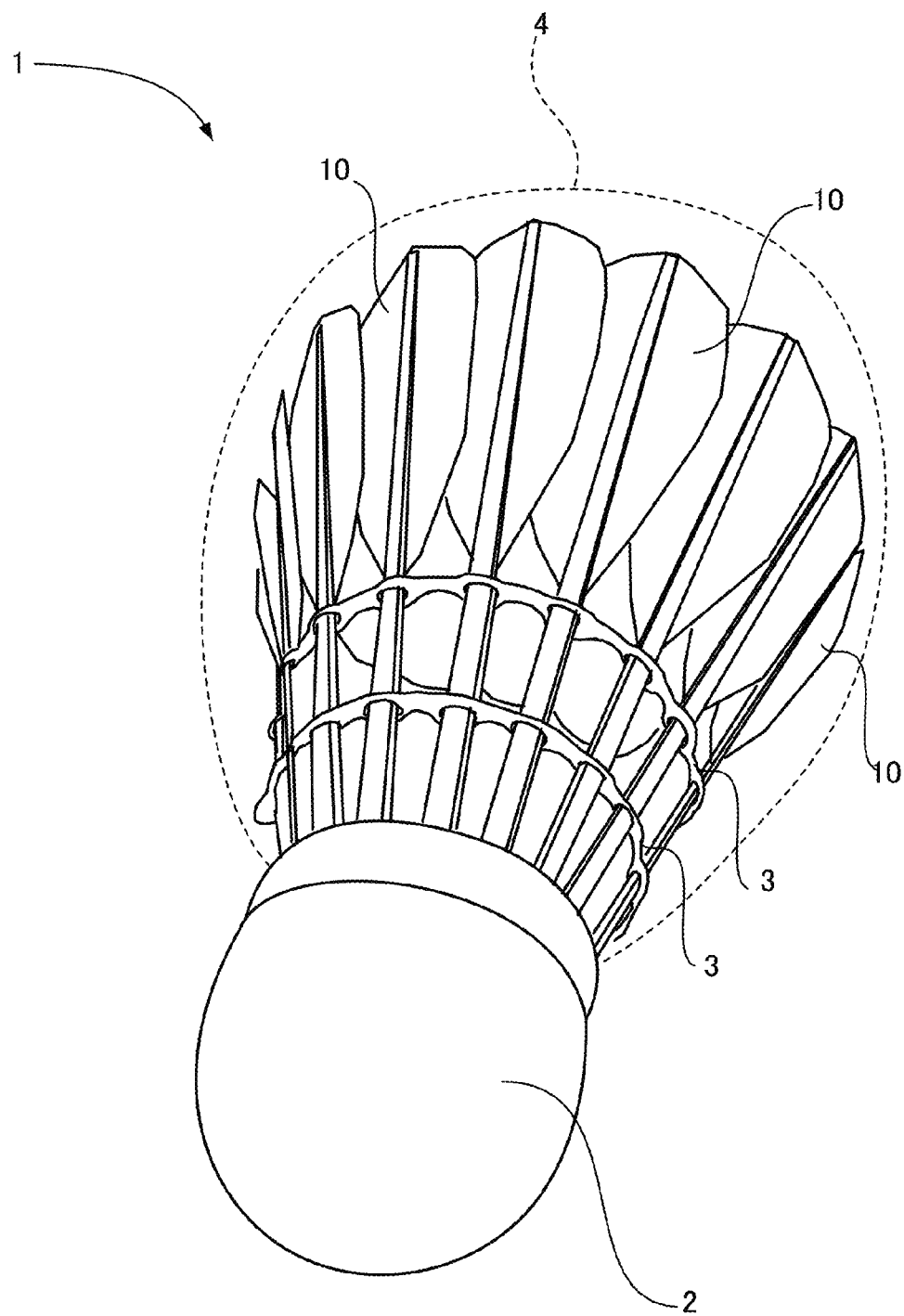
FIG. 1 is a perspective view of an artificial feather shuttlecock using artificial feather according to an embodiment of the present invention seen from the base part side (lower side).

Features of the Embodiments According to the Present Invention

When an artificial feather shuttlecock is used in badminton just for leisure activities, it would be enough for the artificial feathers configuring the shuttlecocks used to achieve lightweight, productivity and durability to some extent. In other words, it would be enough if they were inexpensive and durable. However, those used for workout by athletes, and when they have an ultimate goal to be used as an alternative to official shuttlecocks used in a competition game, there is a need for the vane portion constituting almost the whole area of the artificial feather, in particular, to closely resemble the characteristics, such as, shape retainability and impact-resistance of natural feather above achieving lightweight. For example, there is a hitting method being a so-called "hairpin shot" in badminton which is unique to natural feather shuttlecocks. This hitting method allows the shuttlecock to fly along a unique arc by "lifting" and hitting the shuttlecock so that the shuttlecock is like floating while a strong rotation is applied thereto. An artificial feather having characteristics closely resembling those of natural feather is required to re-create the aforementioned arc orbit with an artificial feather shuttlecock. It is a matter of course that easy manufacturing needs to be allowed in view of increase in cost of natural feather.

Taking into consideration the above, the inventors first raised flying performance and hitting impression similar to those of natural feather as important characteristics required to artificial feather used in the aforementioned artificial feather shuttlecocks. And based on the idea that the material and the structure of the vane portion constituting a large area of the artificial feather would largely influence the performance of the artificial feather shuttlecocks, the inventors concluded that the most important conditions required to the vane portion were excellent shape retainability and impact-resistance avoided from deforming easily even when flying through the air at high speed, in addition to being lightweight.

The present invention has been made in view of these key conditions. And the present invention may include the following characteristics in addition to the characteristics included in the embodiments corresponding to the aforementioned main invention.

The aforementioned thermoplastic resin that configures the aforementioned vane portion is any one of polyamide elastomer, ionomer resin, polyester elastomer, polyolefin-based elastomer, polystyrene-based elastomer, and vinyl chloride-based elastomer.

A thin film reinforcing material is layered on a front face or a back face of the vane portion. And this reinforcing material is any one of waterborne polyurethane, waterborne polyester, waterborne polyolefin, nylon-based emulsion and acrylic-based emulsion.

Or the aforementioned vane portion is impregnated with a reinforcing material. And this reinforcing material is any one of waterborne polyurethane, waterborne polyester, waterborne polyolefin, nylon-based emulsion and acrylic-based emulsion.

Note that, a shuttlecock using artificial feather having any of the aforementioned characteristics is also an embodiment of the present invention. And the present invention covers a method of manufacturing an artificial feather for a shuttlecock, where an embodiment of this manufacturing method is a method of manufacturing an artificial feather for a shuttlecock including a vane portion in a thin film form made of thermoplastic resin having interconnecting bubbles therein, corresponding to a vane, and a rachis portion in a bar form made of thermoplastic resin extending integrally and continuously from an upper tip end to a lower distal end, corresponding to a rachis, to imitate a natural feather, including molding a part that becomes the vane portion or a part that becomes the rachis portion as a primary molded product by injection molding using a first die, molding a secondary molded product made by a part that becomes the rachis portion being fixed to a part that becomes the vane portion by insert molding the rachis portion or the vane portion with the primary molded product as a target to be embedded, using a second die, and molding by using a pellet form resin being a mixture of thermoplastic base resin that configures the vane portion and an organic compound that dissolves in a predetermined solvent, when molding a part that becomes the vane portion, and forming a part that becomes the vane portion into an interconnecting bubble body by immersing the secondary molded product into the solvent to dissolve the organic compound. Or may be altered such that the aforementioned secondary molded product is molded by two-color molding while the aforementioned primary molded product is retained in the aforementioned die.

Further included in the scope of the invention is, a manufacturing method of an artificial feather for shuttlecocks whose aforementioned vane portion includes a core portion forming a core, and an outer shell portion that forms the outer shape covering the side face of this core portion and extended, where an embodiment corresponding to this manufacturing method is a method of manufacturing an artificial feather for a shuttlecock including a vane portion in a thin film form made of thermoplastic resin having interconnecting bubbles therein, corresponding to a vane, and a rachis portion in a bar form made of thermoplastic resin extending integrally and continuously from an upper tip end to a lower distal end, corresponding to a rachis, to imitate a natural feather, including molding a part that becomes the vane portion or a part that becomes the rachis portion as a primary molded product by injection molding using a die, performing two-color molding while retaining the primary molded product in the die, and molding a secondary molded product made by a portion that becomes the rachis portion fixed to a portion that becomes the vane portion, and molding by using a pellet form resin being a mixture of thermoplastic base resin that configures the vane portion and an organic compound that dissolves in a predetermined solvent, when molding a part to be the vane portion, and forming apart that becomes the vane portion into an interconnecting bubble body by immersing the secondary molded product into the solvent to dissolve the organic compound. Or the secondary molded product may be formed by two-color molding while the aforementioned primary molded product is retained in the aforementioned die.

==Structure of Artificial Feather Shuttlecocks==

Figure 2:
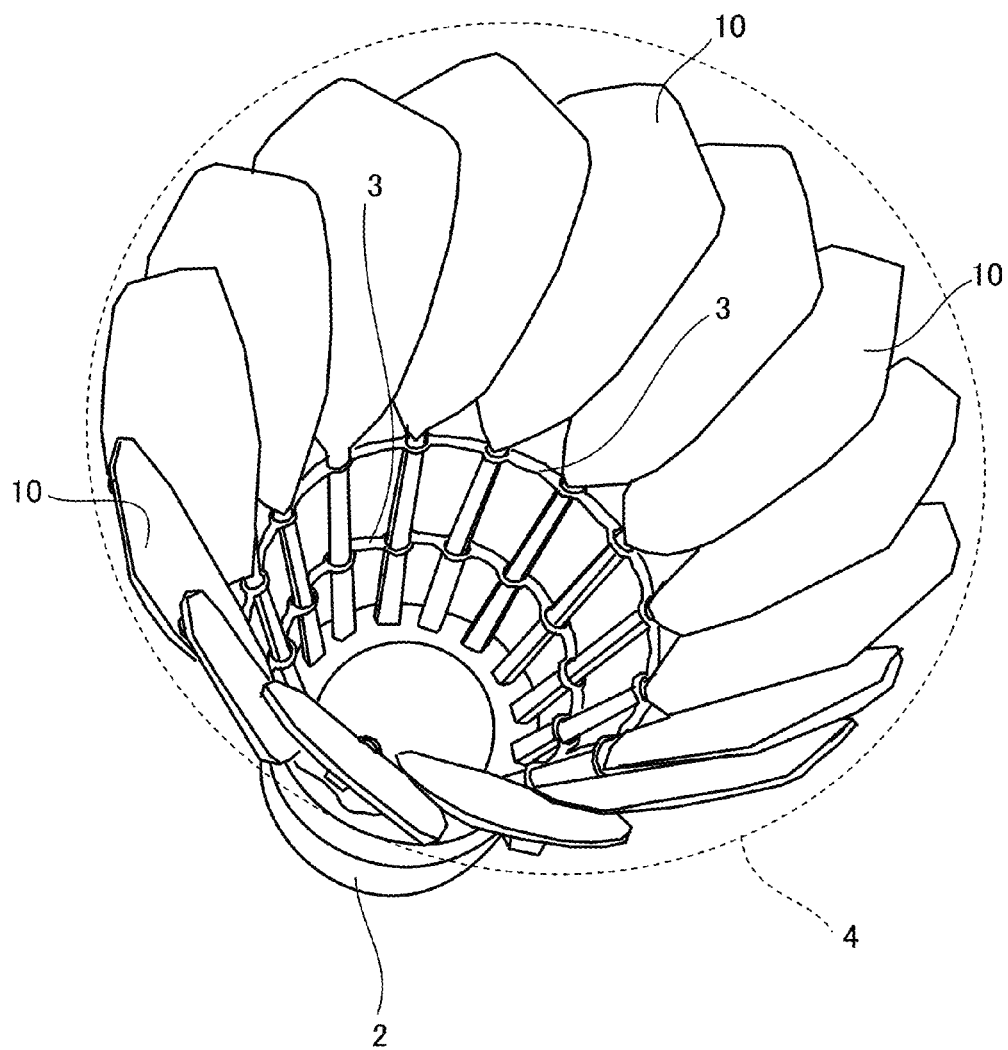
FIG. 2 is a perspective view of the aforementioned artificial feather shuttlecock seen from above.

FIGS. 1 and 2 show external views of the artificial feather shuttlecock (hereinafter shuttlecock) including the artificial feather according to an embodiment of the present invention. FIG. 1 is a perspective view of the shuttlecock 1 seen from the lower side with the base part 2 at the lower side and FIG. 2 is a perspective diagram seen from above. The plurality (for example 16) of artificial feathers 10 resembling natural feather are embedded in an annular form along the circumference of the flat upper plane of the hemispherical base portion 2 so that the diameter becomes larger when approaching the upper portion thereof, while being fixed together with a string like member (for example a cotton string) 3 to form the skirt portion 4.

===Basic Structure of Artificial Feather===

Figure 3:
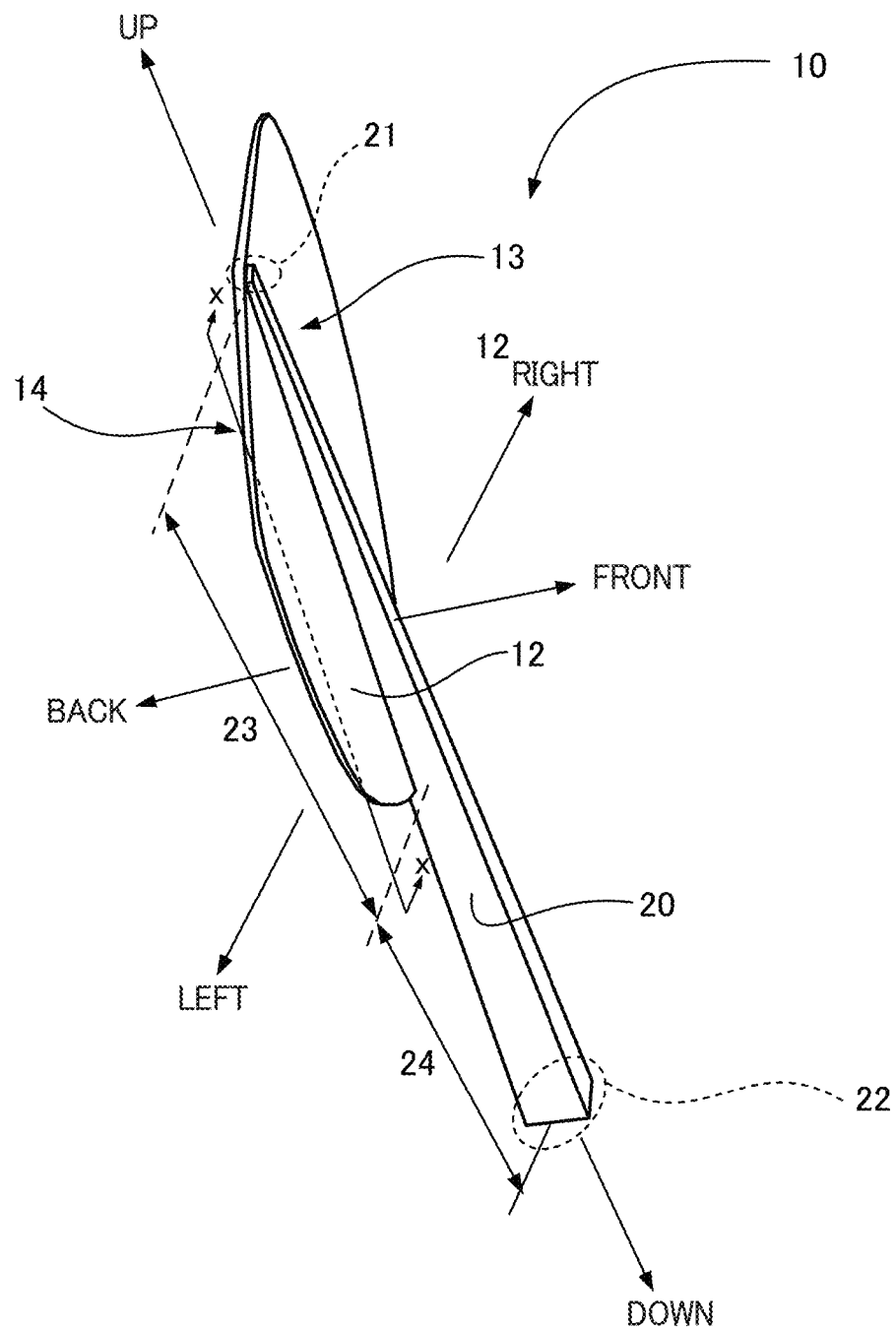
FIG. 3 is a perspective view showing the basic structure of the artificial feather according to an embodiment of the present invention.

FIG. 3 is a diagram showing the basic structure of the artificial feather 10 of an embodiment of the present invention. The artificial feather 10 according to the embodiment of the present invention is based on the premise that the whole artificial feather 10 including the vane portion 12 is configured with a resin molded product and has a basic structure where the vane portion 12 made of thin film-like resin has a bar-like rachis portion 20 adhered or affixed thereto by melting and the like by injection molding to allow massive production and being flexible in providing various shapes. And by structuring the artificial feather 10 with a molded resin product, the shape of the vane portion 12 in particular can be made to resemble a vane form so that achievement of excellent flying performance can be expected. Specifically, a delicate shape with the thicknesses thereof changed delicately at each of the portions can be formed even when the general shape thereof is in a thin film form.

Here, when defining the up, down, right, and left directions or the front and back relations of the artificial feather 10 based on the state in which the artificial feather 10 is mounted to the base portion 2 of the shuttlecock 1, the rachis portion 20 extends from the top end of the vane portion 12 toward the bottom thereof. And for the sake of convenience, the top end 21 of the rachis portion 20 will be called the "tip end" and the bottom mend 22 the "distal end", and in the vane portion 12 and the rachis portion 20, the face that faces the outer side of the shuttlecock 1 will be called the "front face" 13 and the face that faces the inner side of the shuttlecock 1 the "back face" 14. Further, the direction, within the plane of the vane portion 12, orthogonal to the direction in which the rachis portion 20 extends will be called the right-left direction. Furthermore, the area in the rachis portion 20 fixed to the vane portion 12 will be called the vane supporting portion 23 and the area protruding downward of the vane portion 12 will be called the calamus portion 24. Therefore, the rachis portion 20 is fixed to the front face 13 of the vane portion 12 to protrude therefrom with the artificial feather 10 of the shuttlecock 1 exemplified in FIGS. 1 and 2, and the area of the vane portion 12 is divided to the right and left with the rachis portion 20 as the border at the front face 13 side of the vane portion 12.

Note that in the example shown in FIG. 3, the position of the tip end 21 of the rachis portion 20 approximately coincides with the position of the tip of the vane portion 12, however, the tip end 21 of the rachis portion 20 may be below the tip of the vane portion 12. The rachis portion 20 may protrude from the back face 14 of the vane portion 12. Similar to the structure of the vane of natural feather, the vane portion 12 may have a structure such that the vane portion 12 is divided into two with two separate portions with the rachis portion 20 as the border. In any case, one side of the vane portion 12 in a thin film form is called the front face 13 and the other side thereof the back face 14 with the rachis portion 20 formed to run vertically through the vane portion 12. In the following, specific embodiments corresponding to the structure of the vane portion 12 and the rachis portion 20 will be given.

First Embodiment

As described above, the materials forming the vane portion of the artificial feather for shuttlecocks require to have performance capabilities such as having low specific gravity, having shape retainability allowing to quickly return from a deformed state when hit to its initial form, being fixable to other materials, and the like. It is a matter of course that the material requires to meet high productivity expectations. And the artificial feather according to the first embodiment of the present invention has introduced thereto the aforementioned basic structure while having a characteristic of a microscopic structure inside the vane portion to achieve weight reduction and shape retainability for securing productivity and flexibility in shape. In the following, the first embodiment of the artificial feather 10 will be explained with reference to FIG. 3.

In the above-described basic structure, by configuring both the vane portion 12 and the rachis portion 20 with thermoplastic resin, the artificial feather according to the first embodiment secures productivity, flexibility in shape, durability by strengthening the fixing condition between the two. On such basis, reduction in weight is achieved by configuring the vane portion 12 with thermoplastic resin having formed therein innumerable minute bubbles, and further the bubbles are made as interconnecting bubbles so that the impact generated by hitting can be certainly absorbed.

By the way, the reason why the inner structure of the vane portion 12 was made with an interconnecting bubble body rather than an independent bubble body is that when the vane portion 12 is configured with an independent bubble body where each of the adjacent bubbles are independent of each other, the impact applied to a local portion of the vane portion 12 will be absorbed by compressing only the bubbles at the local area. And in such case, there is a possibility that the impact generated by strongly hitting the vane portion 12 may not be certainly absorbed. Whereas an interconnecting bubble body has adjacent bubbles connected to each other, and this allows air in a bubble in a compressed local area, escape to an adjacent bubble when hit so that a strong impact that would suddenly compress a bubble can be certainly absorbed.

===Manufacturing Method of Artificial Feather===

As described above, the artificial feather 10 of the first embodiment uses an interconnecting bubble body made of thermoplastic resin at the vane portion 12. Resins such as polyamide elastomer and polyester elastomer being lightweight and rich in flexibility (hereinafter lightweight flexible resin) can be considered as the specific resin material configuring the interconnecting bubble body. And hard resin having relatively high rigidity compared to lightweight flexible resin (hereinafter hard resin), for example, polyamide (nylon), polyamide reinforced with glass fiber (glass fiber reinforced polyamide) or PBT, ABS, PC and the like can be used as material configuring the rachis portion 20.

Figure 4:
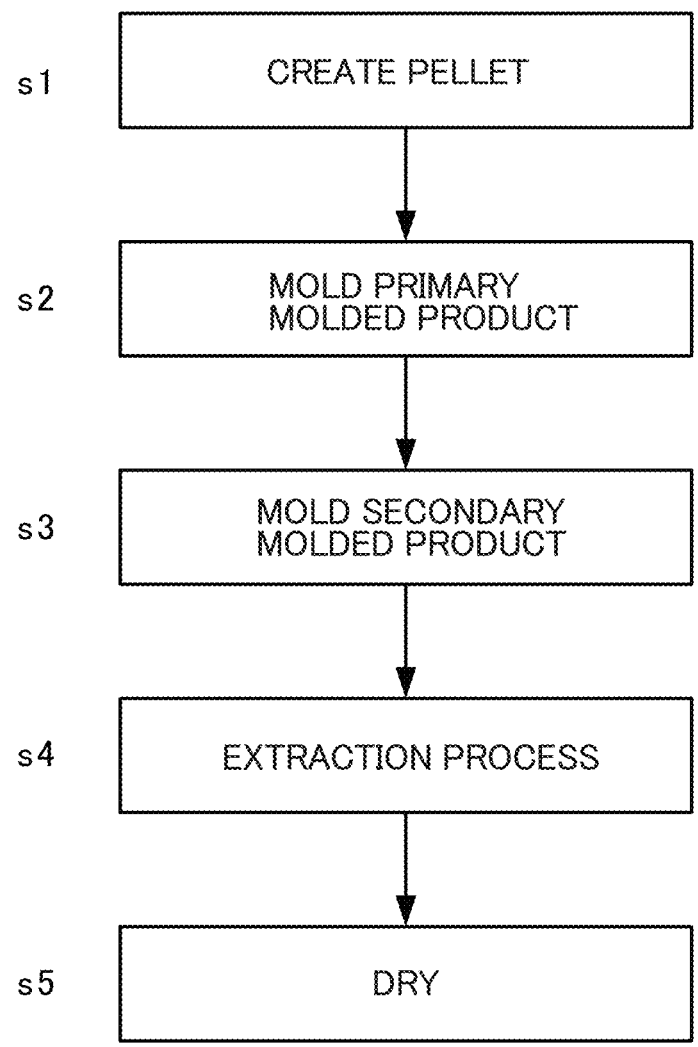
FIG. 4 is a diagram showing the manufacturing method of the vane portion configuring an artificial feather according to the present invention.

Here, polyamide elastomer is given as an example of lightweight soft resin to explain a specific manufacturing method of the artificial feather 10 including a vane portion 12 made of an interconnecting bubble body made of the polyamide elastomer. FIG. 4 shows the manufacturing procedure of the artificial feather 10 according to the first embodiment of the present invention. In the procedure shown, firstly, a pellet made of polyamide elastomer being resin (base resin) that configures the vane portion 12 and an organic compound that dissolves in a predetermined solvent is made (s1). Here, it is assumed that polyamide elastomer does not dissolve in this predetermined solvent. Water solvent polyhydric alcohol (such as sugar alcohols), that is polyhydric alcohol that uses water as the solvent can be used as an example of the organic compounds (hereinafter, bubble generating body) that dissolves in the predetermined solvent. Then polyamide elastomer, the bubble generating body and glycerin are scaled so to make up predetermined weight portions to be mixed thereafter. Then a pellet is made by cutting the mixed matter.

Next, injection molding is performed using the above pellet (s2) to mold the primary molded product that becomes the vane portion 12. Further, the portion that becomes the rachis portion 20 is injection molded by insert molding or two-color molding to melt and fix the rachis portion 20 to the vane portion 12 to complete the secondary molded product having a form of the artificial feather 10. However, at this point, the vane portion 12 is configured of a "solid" material with the inner structure having polyamide elastomer and the bubble generating body intricately mixed and closely-packed therein. Being the case, an extraction process where the secondary molded product is immersed in a predetermined solvent is performed to dissolve only the bubble generating body (s4). Thereby, interconnecting bubbles are formed inside the vane portion 12. Lastly, the secondary molded product after the extraction process is dried to finish the artificial feather 10 (s5).

Note that, the rachis portion 20 can be first molded as the primary molded product and then fix the vane portion 12 to the rachis portion 20 at the molding process of the secondary molded product (s3) instead of molding the vane portion 12 as the primary molded product. It is a matter of course that the vane portion 12 made of an interconnecting bubble body can be completed first and thereafter fix this rachis portion 20 and the separately molded rachis portions 20 together by such as welding or adhesion.

===Characteristics of Artificial Feather===

Here, only the vane portion 12 made of an interconnecting bubble body had been molded as a sample based on the manufacturing method indicated in FIG. 4. Various samples with different specific gravities were made as samples by adjusting the weight ratios of polyamide elastomer and sugar alcohol.

Table 1 shows the specific gravities of the samples before and after the extraction process.

TABLE 1

| SAMPLE | POLYAMIDE ELASTOMER (PARTS BY WEIGHT) | SUGAR ALCOHOL (PARTS BY WEIGHT) | SPECIFIC GRAVITY BEFORE EXTRACTION | SPECIFIC GRAVITY AFTER EXTRACTION |
|---|---|---|---|---|
| A1 | 40 | 60 | 1.22 | 0.49 |
| A2 | 30 | 70 | 1.26 | 0.38 |
| A3 | 20 | 80 | 1.30 | 0.26 |
| A4 | 10 | 90 | 1.35 | 0.13 |

Figure 5:
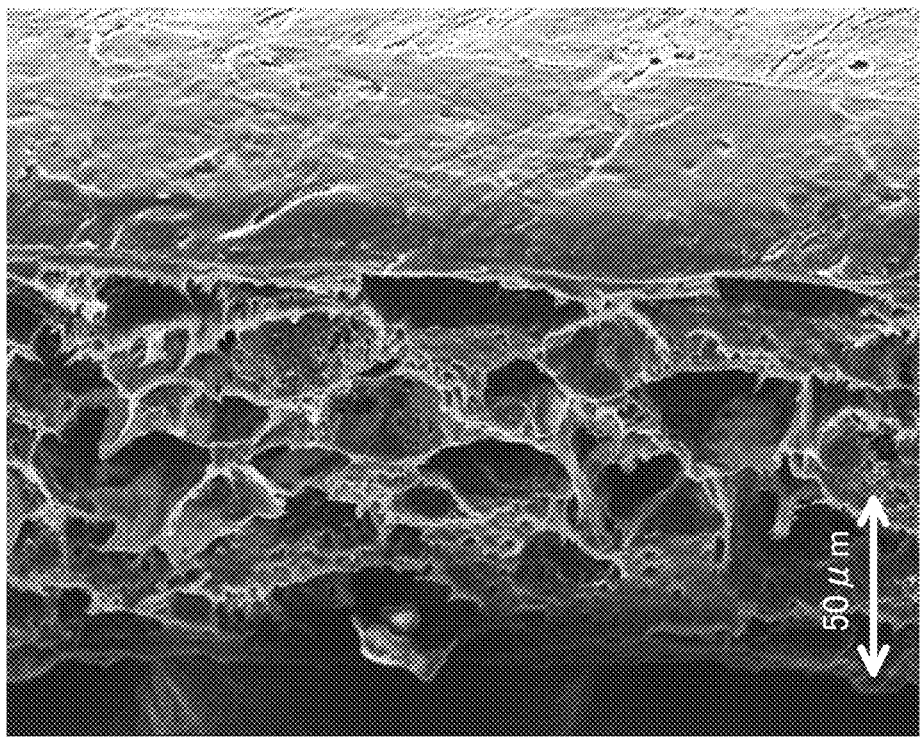
FIG. 5 is a view showing a photomicrograph of a cross-section of a vane portion configuring an artificial feather according to the first embodiment of the present invention.

As shown in Table 1, it was confirmed that the specific gravity can be easily controlled by adjusting the weight ratios of polyamide elastomer and sugar alcohol. Here, the modulus of elasticity of polyamide elastomer is inversely proportional to the weight ratio of sugar alcohol, and the modulus of elasticity of solid material was 130 MPa whereas that of Sample A3 in Table 1 was 10 MPa. FIG. 5 shows a photomicrograph of this Sample A3. This photograph corresponds to an enlarged sectional view seen across line x-x of FIG. 3. As shown in this photograph, the vane portion 12 has arranged therein large bubbles in a beehive form while adjacent bubbles are brought into communication with each other through minute holes. In other words, the inside of the vane portion 12 was confirmed to have a interconnecting bubble body structure. The manufacturing condition of the vane portion 12, that is, the types of base resin and the types of the bubble body structure configuring the vane portion 12, and the proportions thereof and the like is to be set accordingly taking into consideration such as the specific gravity and the modulus of elasticity.

===Structure of the Rachis Portion===

The aforementioned artificial feather 10 of the first embodiment has been configured with the vane portion 12 composed of an interconnecting bubble body made of lightweight soft material, and the rachis portion 20 made of hard material. However, the entire weight of the artificial feather 10 needs to have its weight further reduced to make the artificial feather 10 closely resemble natural feather. And as a result, the weight of the rachis portion 20 needs to be reduced. However, if the rachis portion 20 that primarily requires hardness and rigidity were to be configured with lightweight soft material alike the vane portion 12, rigidity of the artificial feather 10 itself would decrease making it difficult for the artificial feather 10 to retain its shape. Being the case, an embodiment will be described in the following that can meet the expectation of further weight reduction while maintaining the rigidity by devising the structure of the rachis portion 20.

Second Embodiment

The artificial feather according to the second embodiment of the present invention has a characteristic of employing a structure that can make the rachis portion 20 both be lightweight and have high rigidity. Description of the rachis portion 20 structure in the second embodiment will be given below.

<Structure of the Rachis Portion>

Figure 6A:
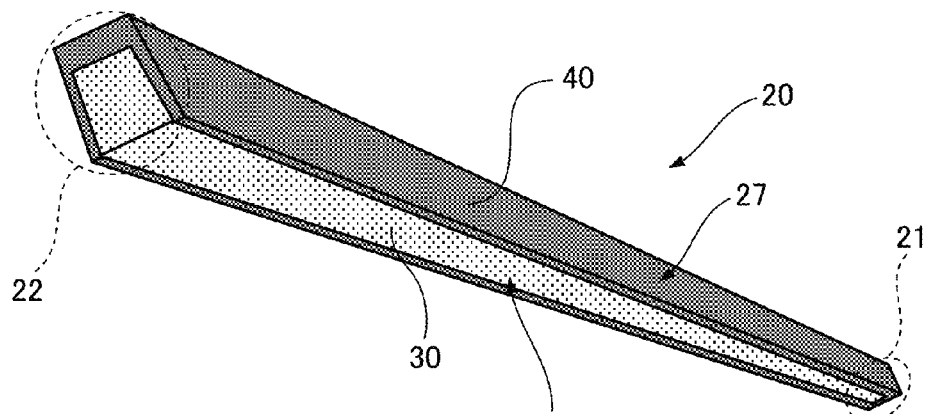
FIG. 6A is a structure diagram of the rachis portion configuring an artificial feather according to the aforementioned second embodiment.
Figure 6B:
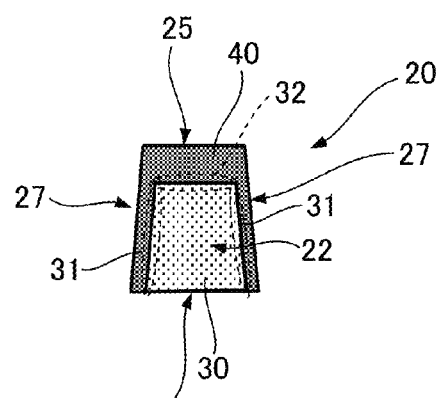
FIG. 6B is a structure diagram of the rachis portion configuring an artificial feather according to the aforementioned second embodiment.
Figure 6C:
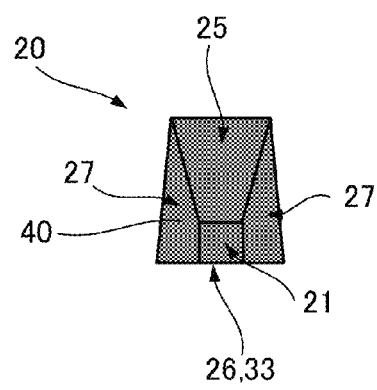
FIG. 6C is a structure diagram of the rachis portion configuring an artificial feather according to the aforementioned second embodiment.

FIGS. 6A to 6C show the structures of the rachis portion 20 in the artificial feather according to the second embodiment of the present invention. FIGS. 6A through 6C shows a perspective view of the back face 26 of the rachis portion 20 seen from the distal end 22 side, a front view of the distal end 22 side and a front view of the tip end 21 side, respectively. The rachis portion 20 is generally a composite structure composed of the outer cell portion 40 positioned on the surface layer, and the core portion 30 positioned inside the outer cell portion 40. And each of the core portion 30 and the outer cell portion 40 are structured integrally continuing from the tip end 21 and the distal end 22 with the two (30, 40) being fixed together. The rachis portion 20 shown here is, as in FIG. 6B, configured with a core portion 30 having an approximately rectangular section and an outer shell portion 40 having a section in an approximately U shape that is opened toward the back face 26. In other words, the sectional shape of the outer shell portion 40 is in a form that covers the right and left sides 31 as well as the front face 32 of the core portion 30, and thereby the right and left sides 27 as well as the front face 25 of the rachis portion 20 is covered by the outer shell portion 40 while the back face 33 of the core portion 30 is exposed to the back face 26 of the rachis portion 20.

As described above, the core portion 30 is made of lightweight soft material being material whose specific gravity is small and elasticity small (soft) relative to the outer shell portion 40. The outer shell portion 40 has a sectional shape covering the surface of the core portion 30 and is made of material whose specific gravity is large and hard (hard material) relative to the core portion 30. The core portion 30 and the outer shell portion 40 are fixed together and integrated by two-color molding and the like. And the vane supporting portion 23 and the calamus portion 24 are formed in a single continuous bar form. The core portion 30 and the outer shell portion 40 are indicated with different hatching patterns in the figure. Note that, here an example where the tip end 21 is covered by the outer shell portion 40 was shown. However, the structure can be such that the core portion 30 is exposed at the tip end 21 and the outer shell portion 40 has an approximate U shaped section along the entire length from the tip end 21 to the distal end 22.

As the material configuring the rachis portion 20 of the above-mentioned structure, thermoplastic resin similar to that used for the vane portion 12, for example, polyamide elastomer and polyester elastomer and an interconnecting bubble body made of these resins can be used for the core portion 30. And resin similar to that used for the rachis portion 20 of the artificial feather 10 of the first embodiment, that is, various resin such as polyamide (nylon) and that reinforced with glass fiber (glass fiber reinforced polyamide) or PBT, ABS, PC and the like can be used for the outer shell portion 40.

<Physical Properties of the Rachis Portion>

Figure 7:
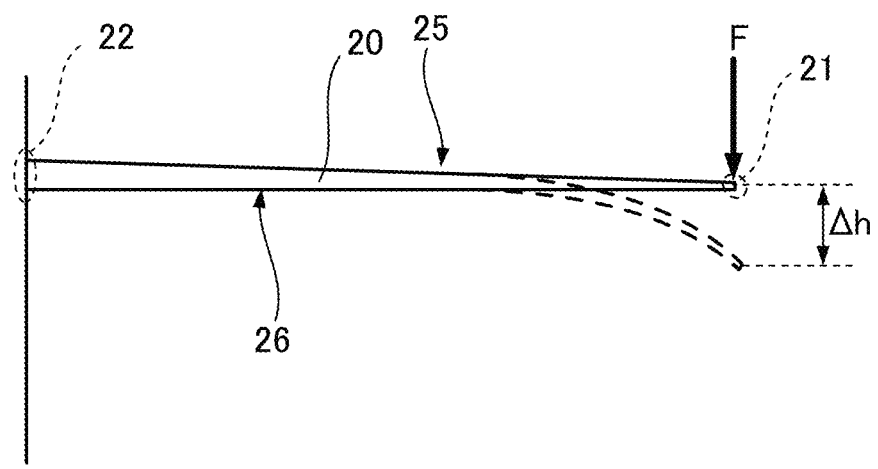
FIG. 7 is a diagram showing a method for evaluating the rigidity of the aforementioned rachis portion.

Here, a sample of the rachis portion 20 with a structure shown in FIGS. 6A to 6C was made using various resins. The size thereof is that of an actually used shuttlecock 1. Insert molding and two-color molding can be introduced as the manufacturing method of the rachis portion 20. In other words, the core portion 30 is injection molded using lightweight soft material, and the outer shell portion 40 made of hard material has to be only formed by insert molding with the above molded product as the subject to be embedded or the outer shell portion 40 has to be only formed by two-color molding without taking out the molded product to be the core portion 30 from the die. Thereafter, the weight of the core portion 30 and the outer shell portion 40 of the rachis portion 20 as well as the whole rachis portion 20 were weighed and its rigidity evaluated. Rigidity evaluation was performed by keeping the rachis portion 20 level so that the back face 26 faces the ground, as shown in FIG. 7, and applying a load F of 0.3 N in the vertical direction at the tip end 21 while the distal end 22 is in a fixed state. Then the amount of displacement Δh when the tip end 21 is loaded was measured from the level state and was set as the index value of rigidity.

The following Table 2 shows the resins used for the core portion 30 and the outer shell portion 40, the weights of each part, the specific gravity, modulus of elasticity, and the total weight and index value of rigidity of the rachis portion 20 as a whole.

TABLE 2

| | CORE PORTION (VOLUME: 63.8 mm$^3$) | | | | OUTER SHELL PORTION (VOLUME: 70.7 mm$^3$) | | | | ALTOGETHER | |
|---|---|---|---|---|---|---|---|---|---|---|
| SAMPLE | RESIN | WEIGHT (g) | ELASTICITY (MPa) | SPECIFIC GRAVITY | RESIN | WEIGHT (g) | ELASTICITY (MPa) | SPECIFIC GRAVITY | TOTAL WEIGHT (g) | RIGIDITY (Δh:mm) |
| B1 | a | 0.065 | 130 | 1.02 | a | 0.072 | 130 | 1.02 | 0.137 | 60.5 |
| B2 | b | 0.083 | 5500 | 1.30 | b | 0.092 | 5500 | 1.30 | 0.175 | 11.2 |
| B3 | c | 0.065 | 1200 | 1.02 | c | 0.072 | 1200 | 1.02 | 0.137 | 35.9 |
| B4 | a | 0.065 | 130 | 1.02 | b | 0.092 | 5500 | 1.30 | 0.157 | 18.9 |
| B5 | d | 0.019 | 10 | 0.30 | b | 0.092 | 5500 | 1.30 | 0.111 | 19.1 |

In Table 2, Samples B4 and B5 are samples (invented articles) that use lightweight soft material for the core portion 30 and hard material for the outer shell portion 40, and Samples B1 to B3 are comparison examples with respect to the invented articles and the core portion 30 and the outer shell portion 40 are formed using the same resin. Note that resins a and d are both polyamide elastomers and therefore the composition of the resin itself is the same, however, their physical structures are different. Resin a is a solid material whose interior is closely-packed and d is a material made of a bubble body such as an interconnecting bubble body and an independent bubble body. Here, a material made of an interconnecting bubble body is used. An interconnecting bubble body has to be only formed in the same manner as the vane portion 12 in the first embodiment. An independent bubble body is made by forming bubbles using an organic blowing agent such as hydrocarbon gas and the like to the resin configuring the core portion 30, similar to well known Styrofoam and urethane sponges.

Further, resins b and c are solid materials that are hard relative to polyamide elastomer. In the present embodiment, resins b and c both use polyamide 12 (nylon 12) as the main body but resin b is made of glass reinforced polyamide 12 and resin c is non-glass reinforced polyamide 12.

As shown in Table 2, samples B4 and B5 of the invented article have the core portion 30 and the outer shell portion 40 molded with appropriate resin with relatively low specific gravity (high specific gravity) and being soft (hard), respectively thus enabling to make the rachis portion 20 lightweight and have high rigidity. For example, sample B1 being a comparison example, having both the core portion 30 and the outer shell portion 40 made of relatively soft resin a is such that the amount of displacement Δh being the index value of rigidity is large showing lack of rigidity. Further, the amount of displacement Δh with sample B3 molded only with resin c classified as relatively hard resin among resins a to d, showed to be 60% of sample B1. And the amount of displacement Δh with sample B2 having the core portion 30 and the outer shell portion 40 made of the hardest resin b, showed to be 20% or less of sample B1 having rigidity five times or more than that of sample B1. However, relatively, since the specific gravity becomes higher as the resin becomes harder, the total weight of sample B2 having the highest rigidity has increased nearly 30% than that of sample B1.

On the other hand, of samples B4 and B5 of the invented article, sample B4 using solid material for the core portion 30 was able to control the amount of displacement Δh to approximately 30% of that of sample 1 under only a weight increase of 15% or less than sample B1. In other words, rigidity that is three times or more higher than sample B1 was obtained. Therefore, sample B4 having approximately 60% or more rigidity compared to the hardest sample B2, can be understood to have enough rigidity. Additionally, further to achieving reduced weight than sample B1, the rigidity of sample B5 is equal to sample B4 thus realizing an almost ideal performance as the vane portion 20.

In the above manner, an artificial feather including a rachis portion 20 with a structure having the core portion 30 made of lightweight material having low specific gravity covered with the outer shell portion 40 made of hard material can both meet contradicting characteristics of lightweight and high rigidity at a high level. Additionally, at least the right and left side faces 27 of the rachis portion 20 are covered by the hard outer shell portion 40 and half or more of the surface area of the soft core portion 30 comes into contact with the outer shell portion 40. Therefore, high rigidity can be developed on two sides being the front-back direction and the right-left direction. On the other hand, since the soft core portion 30 is filled inside the hard outer shell portion 40, impact generated by hitting the surface of the hard rachis portion 20 strongly can be absorbed when the shuttlecock is hit. In other words, the force of repulsion is increased allowing a hitting sense comfortable and that similar to that of natural feather that allows deflection generated when hit to quickly return to its initial form.

Further, when the core portion 30 is made of a bubble body, the sectional area of the rachis portion 20 can be further increased while maintaining reduced weight. Enlargement of the sectional area allows further improvement of rigidity as well as increasing of the fixing area between the vane portion 12 and the vane supporting portion 23. Thereby, the adhering strength between the rachis portion 20 and the vane portion 12 can be further strengthened to prevent breakage when hitting the shuttlecock. Further, a "thick" rachis portion 20 can offer a sense of security to the player that the rachis portion 20 is visually "difficult to break". In other words, a psychological effect can be expected such that the hitting sense very much closely resembling that of natural feather can be attained by enhancing a comfortable hitting sense due to low rigidity of the resin used to the core portion 30.

Note that, the artificial feather used in the second embodiment only has to fix the rachis portion 20 configured with the aforementioned core portion 30 and outer shell portion 40, to the separately made vane portion 12 by methods such as welding and adhesion. Alternatively, in the manufacturing method indicated in FIG. 4, the core portion 30 there only has to be molded in the molding procedure for the secondary molded product, perform injection molding to the secondary molded product configured with the vane portion 12 and the core portion 30 so that the core portion 30 is covered by the outer shell portion 40 and further perform an extraction process and a drying process shown in FIG. 4 to the molded product (tertiary molded product) to lastly become the artificial feather 10 with an appearance shown in FIG. 4. It is a matter of course that the rachis portion 20 can be fixed to the vane portion 12 by injection molding the vane portion 12 to the rachis portion 20 by insert molding or two-color molding after the core portion 30 and the outer shell portion 40 are fixed together by such as injection molding.

Third Embodiment

The artificial feather according to the third embodiment of the present invention, has a structure of the rachis portion 20 similar to the rachis portion 20 of the aforementioned second embodiment and achieved rigidity and reduction in weight of the whole artificial feather and was devised so that the form closely resembled that of natural feather to achieve a flying performance close to those of natural feather shuttlecocks. As is well known, natural feather is a collection of calamus being independent feather growing from the rachis, with regard to the portion corresponding to the vane portion 12, and is divided into inner and outer vanes (inner vexillum, outer vexillum) with the rachis as the border. Therefore, a shuttlecock using artificial feathers closely resembling as much as possible the structure of natural feather should more closely resemble a flying performance of a natural shuttlecock. Therefore, the second embodiment of the present invention has the artificial feather most closely resembling the structure of natural feather.

<Structure of an Artificial Vane>

FIGS. 8A to 8D respectively show a planar view of the front face side of the artificial feather 10a of the second embodiment, a planar view of the back face side thereof, a side view thereof and a front view of the tip end 21 side. The artificial feather 10a of the third embodiment has, as shown in FIG. 8D, the vane portion 12 fixed to the side of the outer shell portion 40 to make an artificial feather 10a with a structure more closely resembling that of natural feather. In other words, the back face 26 of the rachis portion 20 is exposed to the back face 14 of the vane portion 12 at the vane supporting portion 23, and the vane portion 12 is divided into two to the right and left with the rachis portion 20 as the border. Further, the core portion 30 of the rachis portion 20 is made of lightweight soft resin of the kind same as that of the vane portion 12 and the inner structure is made of an interconnecting bubble body similar to the vane portion 12. In this way, the inventors succeeded in making the weight of the entire artificial feather 10b further light.

<Manufacturing Method>

The artificial feather 10a of the third embodiment has a structure where the outer shell portion is fixed to a molded product including a total of three molded portions being the core portion 30 and vane portions 12 divided into two with the core portion 30 as the border. The core portion 30 and the vane portion 12 divided into two can be molded simultaneously while each of the portions are in independent states if molding is performed by for example providing a gate for injection molding to each of the three molding portions.

However, time and manufacturing cost would increase since injection molding of each of the three molding portions are substantially performed separately with such method. Additionally, traces of the gates would remain to the molded product corresponding to each of the injection molded portions so that it would be difficult to closely resemble natural feather, particularly the surface shape. Being the case, a method of manufacturing the artificial feather 10a of the third embodiment that does not increase time and cost while allowing accurate manufacturing will be described in the following. Note that, an example of manufacturing by insert molding will be shown here.

FIG. 9B1 to 9C4 are a schematic views of the die (51a, 52a) used in the manufacturing method of artificial feather 10a of the third embodiment. Sectional shapes of the two dies (first die 51a, and second die 52a) corresponding to the sectional views taken along lines a-a, b-b, c-c, d-d of the artificial feather 10a shown in FIG. 9A are shown in FIGS. 9B1 to 9B4 and 9C1 to 9C4. As shown in the figures, the shape of the first die 51a is in a form for simultaneous molding of the vane portion 12 and the core portion 30. And the shape of the second die 52a is in a form that contains the molded product molded with the first die while forming the outer shell portion 40 that covers the front face 32 and the side faces of the core portion 30.

Figure 10A:
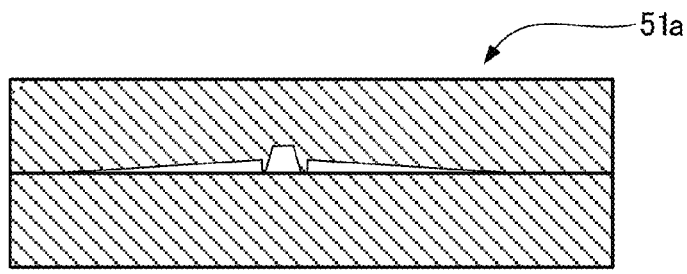
FIG. 10A is a diagram showing the procedures taken for manufacturing artificial feather according to the aforementioned third embodiment.
Figure 10B:
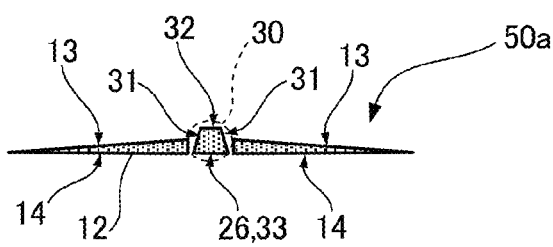
FIG. 10B is a diagram showing the procedures taken for manufacturing artificial feather according to the aforementioned third embodiment.
Figure 10C:
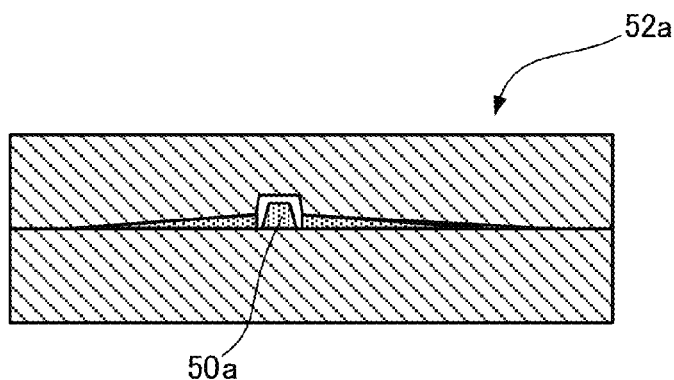
FIG. 10C is a diagram showing the procedures taken for manufacturing artificial feather according to the aforementioned third embodiment.
Figure 10D:
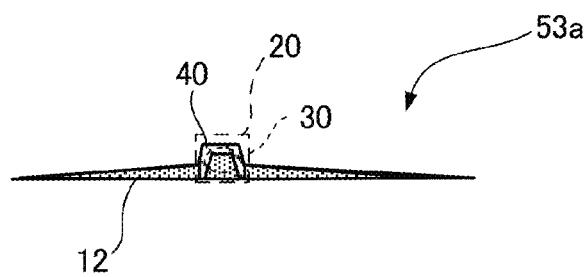
FIG. 10D is a diagram showing the procedures taken for manufacturing artificial feather according to the aforementioned third embodiment.
Figure 11A:
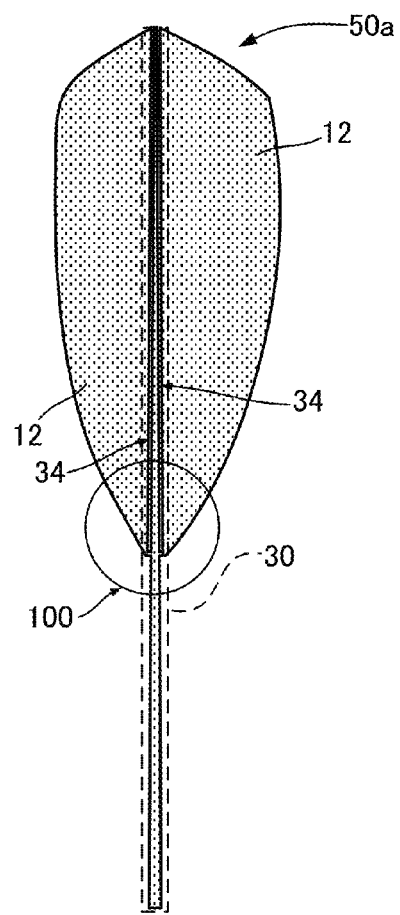
FIG. 11A is a diagram showing a structure of the primary molded product molded in the production process of the artificial feather according to the aforementioned third embodiment.
Figure 11B:
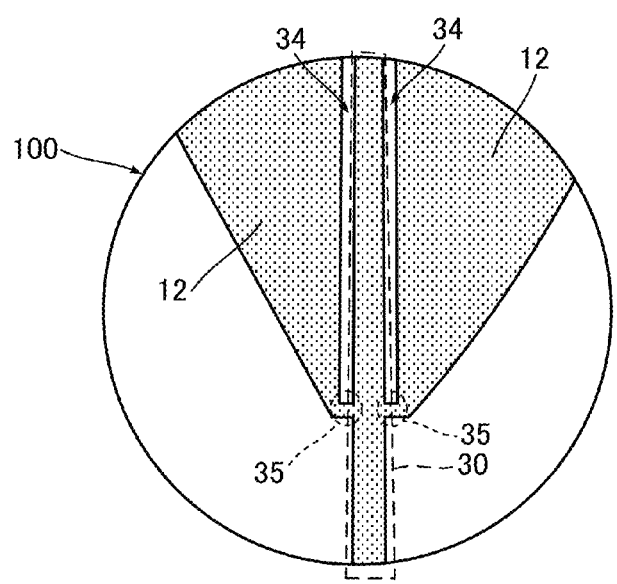
FIG. 11B is a diagram showing a structure of the primary molded product molded in the production process of the artificial feather according to the aforementioned third embodiment.

FIGS. 10A to 10D and FIGS. 11A to 11B are diagrams schematically showing the manufacturing method of the artificial feather 10a of the third embodiment. FIGS. 10A to 10D show the manufacturing procedure of the artificial feather 10a of the third embodiment and show the shapes of the aforementioned b-b section (see FIG. 7) of the artificial feather 10a sequentially molded by the two dies (51a, 52a) in an order according to the manufacturing process. FIG. 11A is a planar view of the primary molded product 50b molded with the first die 51b and FIG. 11B is a view of the part shown in the circle 100 of FIG. 11A in an enlarged state.

The manufacturing method shown here molds the outer shell portion 40 to the surface layer of the core portion 30 by insert molding after molding the core portion 30 and the vane portion 12 simultaneously. And first, the vane portion 12 and the core portion 30 are integrally formed using the first die 51a as shown in FIGS. 10A and 10B. At this time, an integrally molded product (primary molded product) 50a is molded using the pellet including the resin configuring the vane portion 12 and the core portion 30, and the aforementioned bubble generating body. And the primary molded product 50a is in a form with the vane portion 12 and the core portion 30 being divided by a groove 34 extending in the up-down direction as shown in FIG. 11A. And a shape including temporary holdback portions 35 connecting the core portion 30 and the vane portions 12 at the bottom end of the vane support portion 23 as in the enlarged view shown in FIG. 11B are made by making the die 51a for molding the vane portion 12 and the core portion 30 as shown in FIG. 9B3, in a sectional shape connecting the vane portion 12 and the core portion 30 only at the bottom end portion of the vane supporting portion 23.

Next, as in the procedure shown in FIGS. 10C and 10D, resin that becomes the outer shell portion 40 is injected into the die 52a while the primary molded product is in a shape shown in FIGS. 11A and 11B mounted in the secondary die 52a. At this time, the temporary holdback portions 35 melt due to heat during injection molding and melts out from the die 52a by injection pressure. Thereby, the grooves 34 continue from the bottom end of the vane supporting portion 23 to the tip end of the vane portion 12, and the grooves 34 have resin that configure the outer shell portion 40 filled therein. As a result, molding is performed into a shape of the artificial feather 10a having the vane portions 12 fixed to the sides of the outer shell portion 40, as shown in FIG. 8A to 8D to complete a molded product (secondary molded product) where the core portion 30 and the vane portions 12 made of lightweight soft material are fixed integral with the outer shell portion 40 made of hard material. It is a matter of course that the above-mentioned manufacturing method can be done by two-color molding instead of insert molding.

Lastly, in order to make the vane portion 12 and the core portion 30 into the aforementioned interconnecting bubble body, the secondary molded product 53a removed from the secondary die 52a only has to be immersed in a predetermined solvent to make the resin configuring the core portion 30 and the vane portion 12 into an interconnecting bubble body. In this way, the artificial feather 10a of the third embodiment has also the core portion 30 of the rachis portion 20 in addition to the vane portion 12 made of an interconnecting bubble body thus further reducing the entire weight of the artificial feather 10a. And not only the vane portion 12 but the rachis portion 20 when hit, can be expected to offer a hitting sense quite close to that of natural feather. It is a matter of course that the shape of the artificial feather 10a can quickly return to is initial state when hit while having enough rigidity since the surface of the core portion 30 is covered with the outer shell portion 40 using hard material. Therefore, with the synergistic effect with a form extremely resembling natural feather having the vane portion 12 divided by the rachis portion 20, artificial feather shuttlecocks using this artificial feather 10a can be expected to exhibit flying performance extremely resembling that of natural feather shuttlecocks.

Modified Example of the Third Embodiment

The artificial feather 10a of the third embodiment has the vane portion 12 divided to the right and the left with the rachis portion 20 as the border. And a method of accurately manufacturing the artificial feather 10a with this structure has been described above. However, in the aforementioned manufacturing method, there is more than little possibility that a part or the whole of the temporary holdback portions 35 made of lightweight soft material would not certainly melt out and remain in the portions that are ideally to be the outer shell portion 40.

FIG. 12A to 12C exemplifies an artificial feather 10b in a state with the temporary holdback portions 35 remaining. FIG. 12A is a planar view of the entire artificial feather 10b seen from the back face and FIG. 12B is a view of the part shown in the circle 101 of FIG. 12A in an enlarged state. FIG. 12C shows the sectional view seen along line e-e in FIG. 12B. As shown in FIGS. 12A to 12C, since the core portion 30 is not covered by the outer shell portion 40 at portion 36 where the temporary holdback portions 35 remains lacks strength so that there is a possibility that the rachis portion 20 would break at this portion 36 when the shuttlecock is hit hard. Of course, an artificial feather 10b lacking a part of the outer shell portion 40 as above is handled as a defect. Therefore, there is a concern that manufacturing costs would rise due to lowering of the production yield. For this reason, a manufacturing method that can sufficiently maintain the strength of the rachis portion 20 even when the temporary holdback portions 35 do not completely melt out will be given as a modified example of the third embodiment.

Figure 13A:
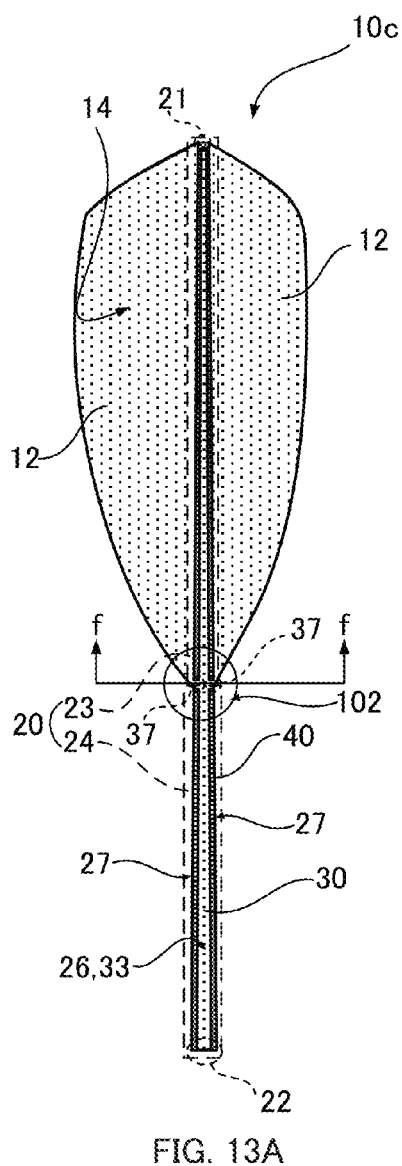
FIG. 13A is a diagram showing an outline of the manufacturing method for solving a problem of the artificial feather according to the aforementioned third embodiment.
Figure 13B:
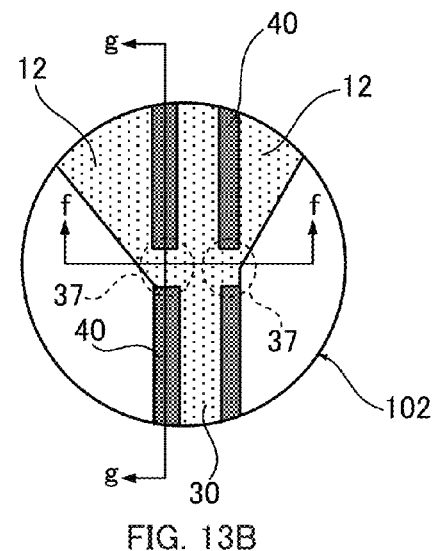
FIG. 13B is a diagram showing an outline of the manufacturing method for solving a problem of the artificial feather according to the aforementioned third embodiment.
Figure 13C:
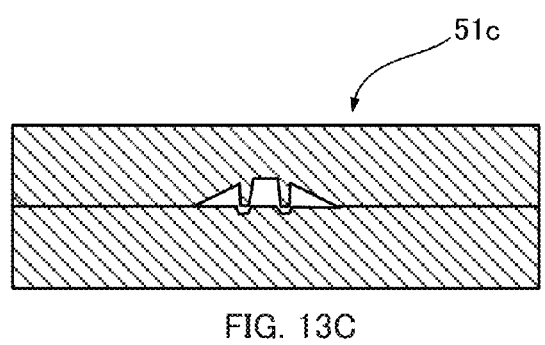
FIG. 13C is a diagram showing an outline of the manufacturing method for solving a problem of the artificial feather according to the aforementioned third embodiment.
Figure 13D:
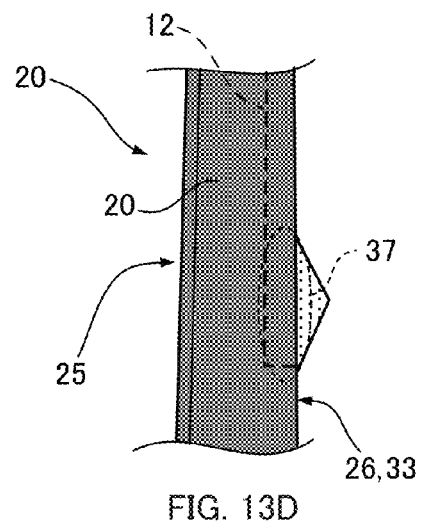
FIG. 13D is a diagram showing an outline of the manufacturing method for solving a problem of the artificial feather according to the aforementioned third embodiment.

FIGS. 13A to 13D show schematic views of the manufacturing method of the artificial feather 10c of a modified example of the third embodiment. FIG. 13A is a diagram showing the artificial feather 10c seen from the back in a state where the portions 37 of the temporary holdback portions 35 remain and FIG. 13B is a view of the part shown in the circle 102 of FIG. 13A in an enlarged state. FIG. 13C shows a sectional diagram of the die 51c for molding the primary molded product of the artificial feather 10c of this modified example and corresponds to section f-f of the artificial feather 10c shown in FIGS. 13A and 13B. FIG. 13D shows the sectional view seen along line g-g in FIG. 13C.

In this modified example, the die is formed so that the temporary holdback portions 35 are formed to protrude downward than the lower face of the vane portion 12, as shown in FIG. 13C. In other words, the primary molded product is molded such that the bottom face of the grooves 34 do not protrude to the front side (12, 25) at the portions where the temporary holdback portions 35 are formed, but the temporary holdback portions 35 protrude to the back side direction of the bottom surface of the grooves 34. For such reason, the rachis portion 20 would not lack strength since the outer shell portion 40 completely covers the side faces of the original core portion 30 even when the temporary holdback portions 35 do not completely melt out and apart thereof (non-melt out portion) 37 remains, as shown in FIG. 13D. Note that, this non-melt out portion 37 of these temporary holdback portions 35 may be left as they are if they do not badly deteriorate the flying performance of the artificial feather 10c since they do not pose strength problems. Or this protruding non-melt out portion 37 may be shaved off or cut apart in a later manufacturing process if an extremely high level of flying performance is required or if it is judged to spoil the appearance as a product.

Fourth Embodiment

The artificial feather 140a of the aforementioned third embodiment had a structure more closely resembling natural feather. And a particular manufacturing method of melting the temporary holdback portions 35 provided to the primary molded product when molding the secondary molded product was employed for accurately molding the structure. Further, there is a possibility that the cost of the die may slightly increase since the shape of the die for forming the temporary holdback portions 35 is complicated. Therefore, there can be conceived a way of improving the production yield by simplifying the shape to some extent without closely resembling the shape of natural feather. An artificial feather having a structure taking into consideration the production yield will be given as the fourth embodiment of the present invention.
<Structure for Fixing with the Vane Portion>
FIGS. 14A to 14D show the basic structures of the artificial feather 10d according to the fourth embodiment of the present invention. FIGS. 14A to 14D respectively show a planar view of the front side of the artificial feather 10d, a planar view of the back face thereof, a side view thereof and a front view seen from the tip end 21 side. Note that the core portion 30 and the outer shell portion 40 of the rachis portion 20 are indicated with different hatching patterns in also these FIGS. 14A to 14D. As shown in these figures, the artificial feather 10d of the fourth embodiment has a structure where the rachis portion 20 with a structure shown in FIGS. 6A to 6C fixed to the front face 13 of a single vane portion 12 in a thin film form. And the appearance configuration is substantially the same as the artificial feather 10 in the first and second embodiments shown in FIG. 3. That is, the front side 25 and the side faces 27 of the rachis portion 20 become the surface of the outer shell portion 40 and with regard to the vane supporting portion 23, the back face 26 of the rachis portion 20 and the front face 13 of the vane portion are fixed together with the two being brought into a contact state.
<Manufacturing Method>
The manufacturing method of artificial feather of the first and the second embodiments had the rachis portion 20 and the vane portion 12 fixed by welding or adhesion after molding the two (20, 12) separately. As an alternative method, the vane portion 12, the core portion 30 and the outer shell portion 40 were respectively formed in separate injection molding processes.

However, in order to allow flexible setting of the shape of the vane portion 12 and the relative positional relations between the vane portion and the rachis portion 20 while strongly fixing together the vane portion 12 and the rachis portion 20, it is preferable that the vane portion 12 and the core portion 30, or the vane portion 12 and the outer shell portion 40 are simultaneously formed using the same material. Practically, since the vane portion 12 requires to be lightweight and shock absorptive, it is preferable that the vane portion 12 is simultaneously molded with the core portion 30.

The artificial feather 10d of the fourth embodiment has a structure having the outer shell portion 40 cover the core portion 30 at parts besides the back face 26 of the rachis portion 20, and the back face 33 of the core portion 30 remains exposed. Therefore, the vane portion 12 and the core portion 30 are simultaneously molded so that the core portion 30 protrudes to the front face 13 of the vane portion 12 at the vane supporting portion 23. A method of manufacturing the artificial feather 10d of the fourth embodiment by insert molding will be exemplified in the following description.

FIGS. 15A to 15C3 are schematic diagrams of the dies (51d, 52d) used in the manufacturing method of the artificial feather 10d of the fourth embodiment. FIGS. 15B1 to 15B3 and FIGS. 15C1 to 15C3 show the sectional shapes of the two dies (the first die 51d and the second die 52d) that correspond to the respective sections h-h, i-i and j-j of the artificial feather 10d shown in FIG. 15A. As shown in the figures, the shape of the die of the first die 51d has a shape for simultaneously forming the vane portion 12 and the core portion 30. And the second die 52d has a shape for molding the outer shell portion 40 that covers the front face 32 and the side faces 31 of the core portion 30 while containing the molded product molded by the first die as a subject to embedding.

FIGS. 16A to 16D are diagrams showing the manufacturing procedure of the artificial feather 10d of the third embodiment and show the shapes of the aforementioned i-i section (see FIGS. 15A to 15C3) of the artificial feather 10d sequentially molded in the aforementioned dies (51d, 52d) in an order of the manufacturing process. In the manufacturing method shown here, first the core portion 30 and the vane portion 12 are simultaneously molded and thereafter the outer shell portion 40 is molded on the surface layer of the core portion 30 by insert molding.

Figure 16A:
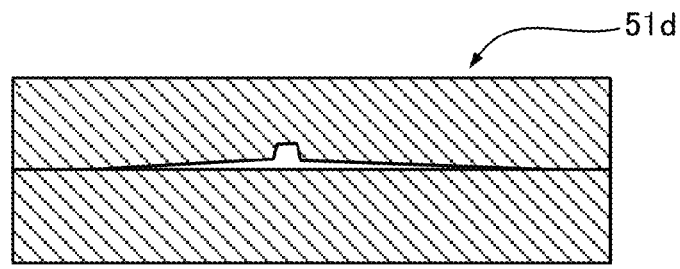
FIG. 16A is a diagram showing the procedures taken for manufacturing artificial feather according to the aforementioned fourth embodiment.
Figure 16B:
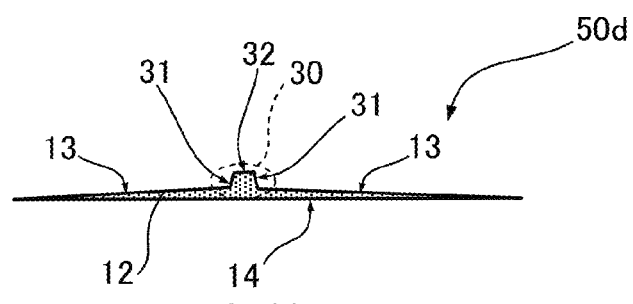
FIG. 16B is a diagram showing the procedures taken for manufacturing artificial feather according to the aforementioned fourth embodiment.
Figure 16C:
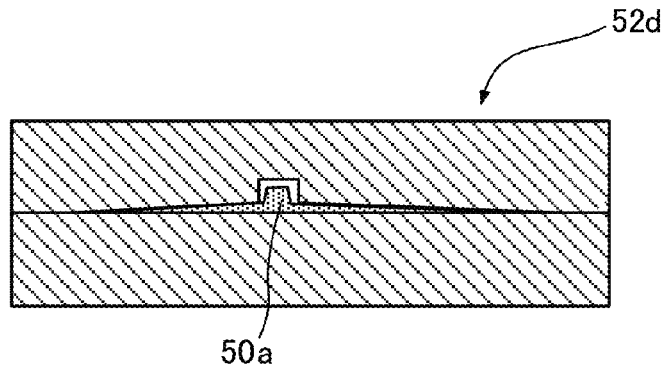
FIG. 16C is a diagram showing the procedures taken for manufacturing artificial feather according to the aforementioned fourth embodiment.
Figure 16D:
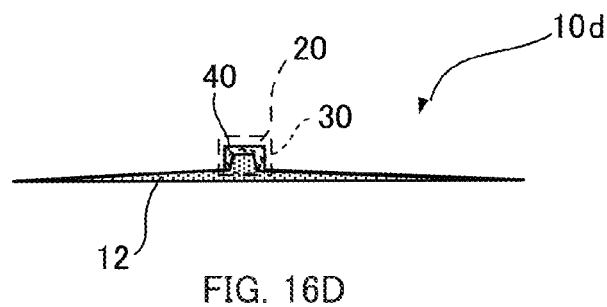
FIG. 16D is a diagram showing the procedures taken for manufacturing artificial feather according to the aforementioned fourth embodiment.

Then, first the vane portion 12 and the core portion 30 are integrally molded using the first die 51d to obtain the primary molded product as shown in FIGS. 16A and 16B. Note that in this fourth embodiment, the primary molded product is molded using the pellet including the aforementioned bubble generating body. Next, resin that becomes the outer shell portion 40 is injected into the second die 52d while the primary molded product 50d is mounted in this die 52d as shown in FIG. 16C. The secondary die 52d covers the side faces 31 and the front face 32 of the core portion 30 while containing the primary molded product 50d and has a die form with a U-shaped section when the primary molded product 50d is in a mounted state. Then the outer shell portion 40 is molded to the front face 32 and the side faces 31 of the core portion 30 by injection molding using the second die 52d, and the secondary molded product 53d is completed by the core portion 30 and the vane portion 12 made of lightweight soft material being integrally fixed with the outer shell portion 40 made of hard material as shown in FIG. 16D. And in order to make the vane portion 12 and the core portion 30 into the aforementioned interconnecting bubble body, the secondary molded product 53d removed from the second die 52d only has to be immersed in a predetermined solvent to make the resin configuring the core portion 30 and the vane portion 12 into an interconnecting bubble body.

Note that the vane portion 12 and the core portion 30 were made into a primary molded product in the aforementioned manufacturing method, however, it is a matter of course that the outer shell portion 40 may be first molded into a primary molded product and then molded so to fix the vane portion 12 and the core portion 30 to the outer shell portion 40.

By the way, a high production yield can be expected with the artificial feather 10d of the fourth embodiment since its shape is simple compared to the structure of the artificial feather 10a of the third embodiment. And with regard to the molding conditions, the temporary holdback portions 35 need not be certainly melted out so that a molding condition does not need to be strictly determined as with the artificial feather 10a of the third embodiment. Therefore, the fourth embodiment may be advantageous compared to the third embodiment with regard to manufacturing cost.

Meanwhile, the artificial feather 10a of the third embodiment compared with the artificial feather 10d of the fourth embodiment does not have resin for configuring the vane portion 12 to the area of the vane supporting portion 23, and allows to cut down the amount of resin used for fixing to the back face 26 of the supporting portion 23. Indeed, the amount of resin that can be cut down with a single artificial feather 10a is minute and the amount of cost saved for a single artificial feather 10a may be minimal. But as shown in FIGS. 1 and 2, the shuttlecock 1 is configured by attaching approximately 16 feathers to the base portion 2 so that even if the cost saved for a single artificial feather 10a may be minimal, cost savings to some degree may be expected for the shuttlecock 1 as a whole.

Therefore, the artificial feather (10a or 10d) to be employed between that of the third embodiment or that of the fourth embodiment should be determined accordingly taking into consideration the flying performance required to the product, costs required for raw material and the costs required for manufacturing. In other words, the present invention can provide shuttlecocks of different flying performances and price according to the purpose and use such as for workout and as an alternative to official shuttlecocks, or the difference in the skill in badminton of the shuttlecock user.

Other Embodiments

Back Face of the Vane Portion and the Back Face of the Rachis Portion

The back face 14 of the vane portion 12 and the back face 26 of the rachis portion 20 were in the same plane with the artificial feathers 10a to 10d of the first to fourth embodiments, however, they need not be in the same plane as in the artificial feather 10e shown in FIGS. 17A to 17D. FIGS. 17A to 17D show the planar view of the artificial feather 10e on the front face 13 side, a planar view thereof on the back face 14 side, a side face view thereof and a front face view of the tip end 21 side. And the artificial feather 10e exemplified in FIGS. 17A to 17D has a level difference between the back face 14 of the vane portion 12 and the back face 26 of the calamus portion 24 at the rachis portion 20e. That is, this artificial feather 10e has an appearance configuration with the rachis portion 20e in a bar form layered on the front face 13 of the vane portion 12.

<Structure of the Calamus Portion>

Figure 18A:
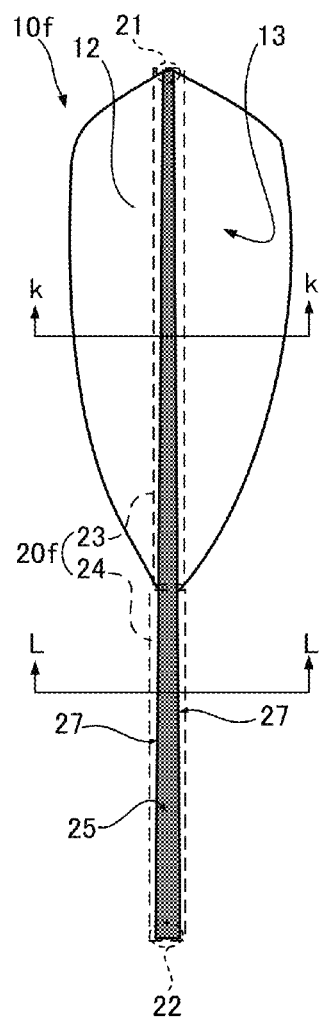
FIG. 18A is a diagram showing an external configuration of the artificial feather according to another embodiment of the present invention that has the calamus portion of the rachis portion formed only with resin that forms the outer shell portion.
Figure 18B:
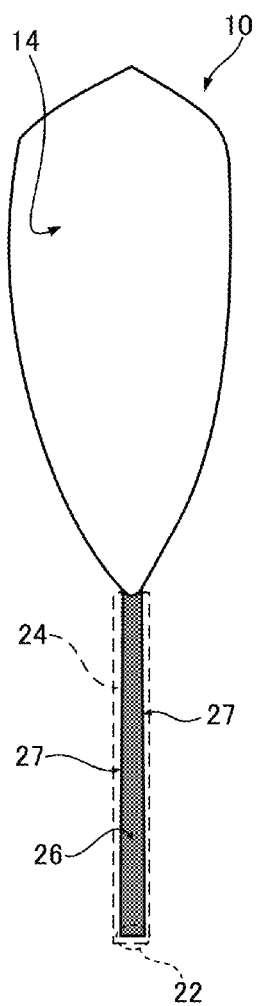
FIG. 18B is a diagram showing an external configuration of the artificial feather according to another embodiment of the present invention that has the calamus portion of the rachis portion formed only with resin that forms the outer shell portion.
Figure 18C:
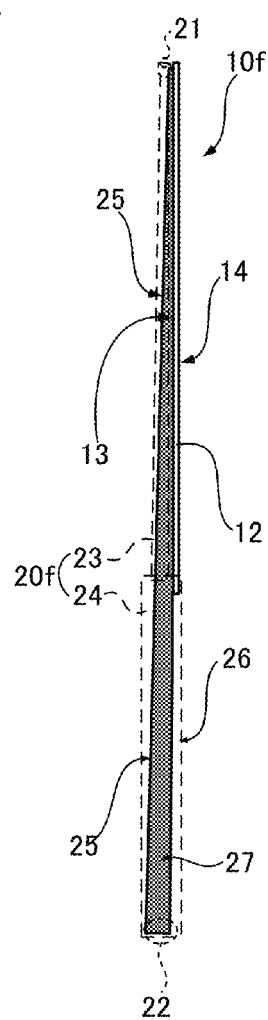
FIG. 18C is a diagram showing an external configuration of the artificial feather according to another embodiment of the present invention that has the calamus portion of the rachis portion formed only with resin that forms the outer shell portion.
Figure 19A:
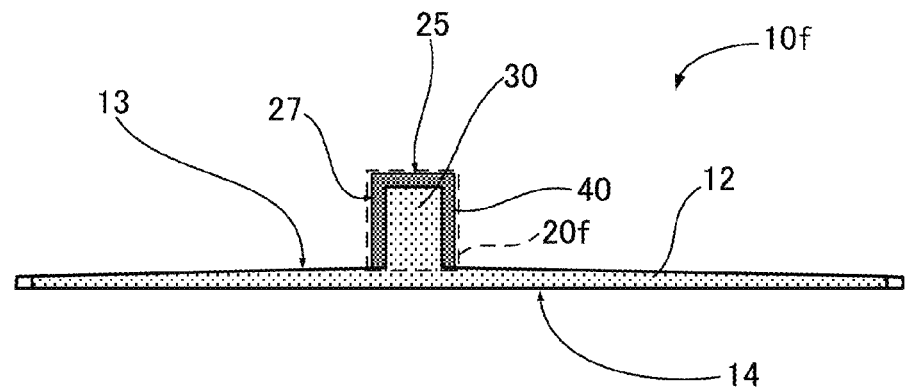
FIG. 19A is a diagram showing the cross-sectional plane of the artificial feather shown in FIG. 18A.
Figure 19B:
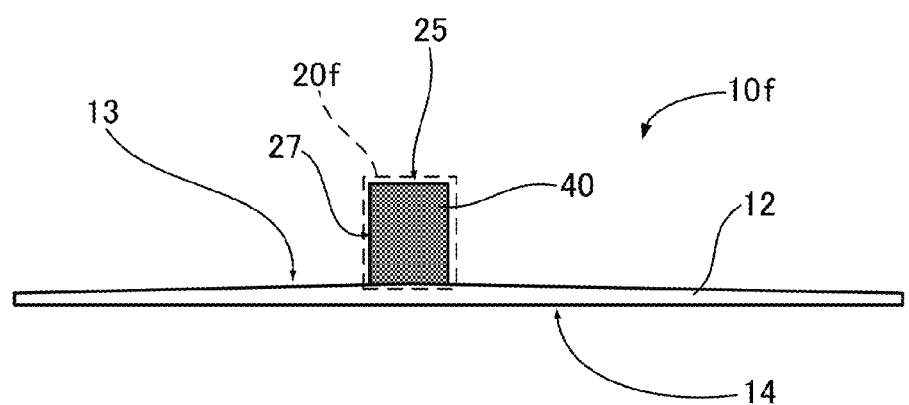
FIG. 19B is a diagram showing the cross-sectional plane of the artificial feather shown in FIG. 18A.

The rachis portions 20 of the artificial feathers 10a to 10d of the aforementioned first to fourth embodiments and the rachis portion 20e of the artificial feather 10e shown in FIGS. 17A to 17D had the core portion 30 and the outer shell portion 40 formed to also to the calamus portion 24. However, as in the artificial feather 10f shown in FIGS. 18A to 18C and 19A to 19B, the calamus portion 24 may be formed only with resin that configures the outer shell portion 40. Note that, FIGS. 18A to 18C respectively show a planar view of the front face 13 side of the artificial feather 10f, a planar view of the back face 14 side thereof and a side view thereof. And FIGS. 19A and 19B are sectional diagrams seen along lines k-k and l-l in FIG. 18A, respectively. As shown in these FIGS. 18A to 18C and 19A to 19B, the rachis portion 20f of the artificial feather 10f does not have the core portion 30 to the calamus portion 24 but has a calamus portion 24 that is integrally formed with resin that configures the outer shell portion 40.

<Sectional Structure of the Calamus Portion>

Figure 20A:
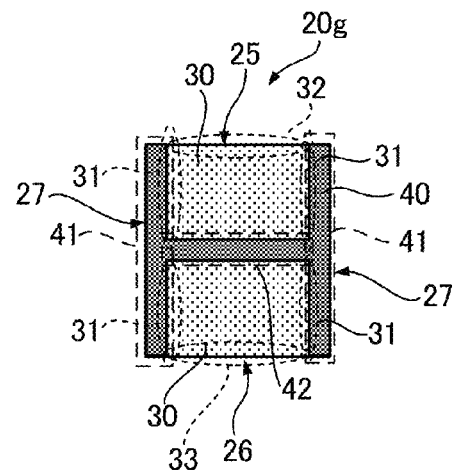
FIG. 20A is a diagram showing the cross-sectional plane of the rachis portion having a structure different from the rachis portion of the aforementioned first to fourth artificial feathers.

The sectional structure of the rachis portion 20 is not limited to that shown in FIGS. 6A to 6C and may have, for example, the sectional shape of the outer shell portion 40 made into an "H" form made from sides 41 that comes into contact with the right and left sides 31 of the core portion 30, and sides 42 that crosses proximate the section center of the core portion 30 in the right-left direction to connect the aforementioned sides 41 contacting the right and left side faces 31, as shown in the rachis portion 20g of FIG. 20A. Note that in this example, the structure is such that the front face 32 and the back face 33 of the core portion 30 are exposed at the front face 25 and the back face 26, respectively. However, the sectional shape of the outer shell portion 40 can be made into an "I" form by a 90 degree rotation of the rachis portion 20c around the axis.

Figure 20B:
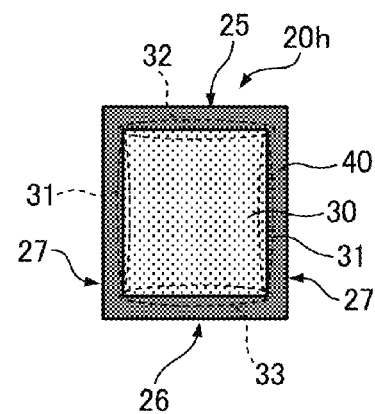
FIG. 20B is a diagram showing the cross-sectional plane of the rachis portion having a structure different from the rachis portion of the aforementioned first to fourth artificial feathers.

Alternatively, as with the rachis portion 20h shown in FIG. 20B, a form with the outer shell portion 40 in a thin tubular shape and the core portion 30 filled in the hollow part, in other words a "rectangular" sectional shape, that is, a hollow rectangular tube shape with all the right and left side faces 31, the front face 32 and the back face 33 of the core portion 30 covered with the outer shell portion 40 can be used. Note that, similar to the first embodiment, the vane portion 12 and the rachis portions (20g, 20h) may be positioned to the side faces 27 of the rachis portions (20g, 20h), or may be fixed with the back face 26 of the rachis portions (20g, 20h) and the front face 13 of the vane portion 12 coming into contact with each other as in the second embodiment.

Figure 20C:
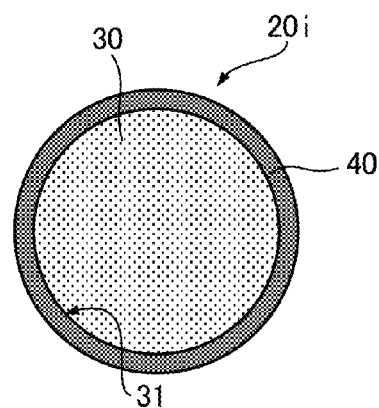
FIG. 20C is a diagram showing the cross-sectional plane of the rachis portion having a structure different from the rachis portion of the aforementioned first to fourth artificial feathers.
Figure 20D:
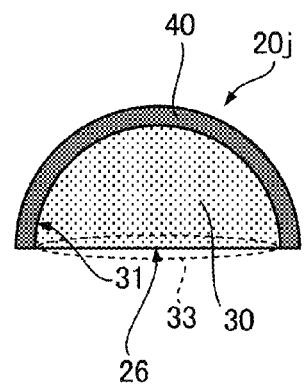
FIG. 20D is a diagram showing the cross-sectional plane of the rachis portion having a structure different from the rachis portion of the aforementioned first to fourth artificial feathers.
Figure 20E:
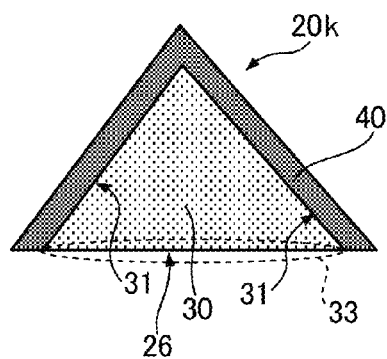
FIG. 20E is a diagram showing the cross-sectional plane of the rachis portion having a structure different from the rachis portion of the aforementioned first to fourth artificial feathers.

It is a matter of course that the sectional shape of the core portion 30 is not limited to a rectangular shape. For example, the sectional shape may be a circle (FIG. 20C), a semicircle (FIG. 20D) or a triangle (FIG. 20E) as the rachis portions (20i to 20k) shown in FIGS. 20C to 20E. In the case where the sectional shape is of a circle, the entire circumference of the core portion 30 becomes the side face and the side face is not clearly distinguished between the side face 31, the front face 32, and the back face 33. Further, in the case where the sectional shape is of a semicircle (FIG. 20D) or a triangle (FIG. 20E), the faces besides the back face 33 of the core portion 30 substantially becomes the side face 31. In any case, the artificial feather of the embodiments of the present invention has a feature of its rachis portions (20, 20g to 20k) having structures where the side faces of the core portion 30 made of relatively low specific gravity and soft material are covered with the outer shell portion 40 made of hard material.

<Manufacturing Method>

Figure 21:
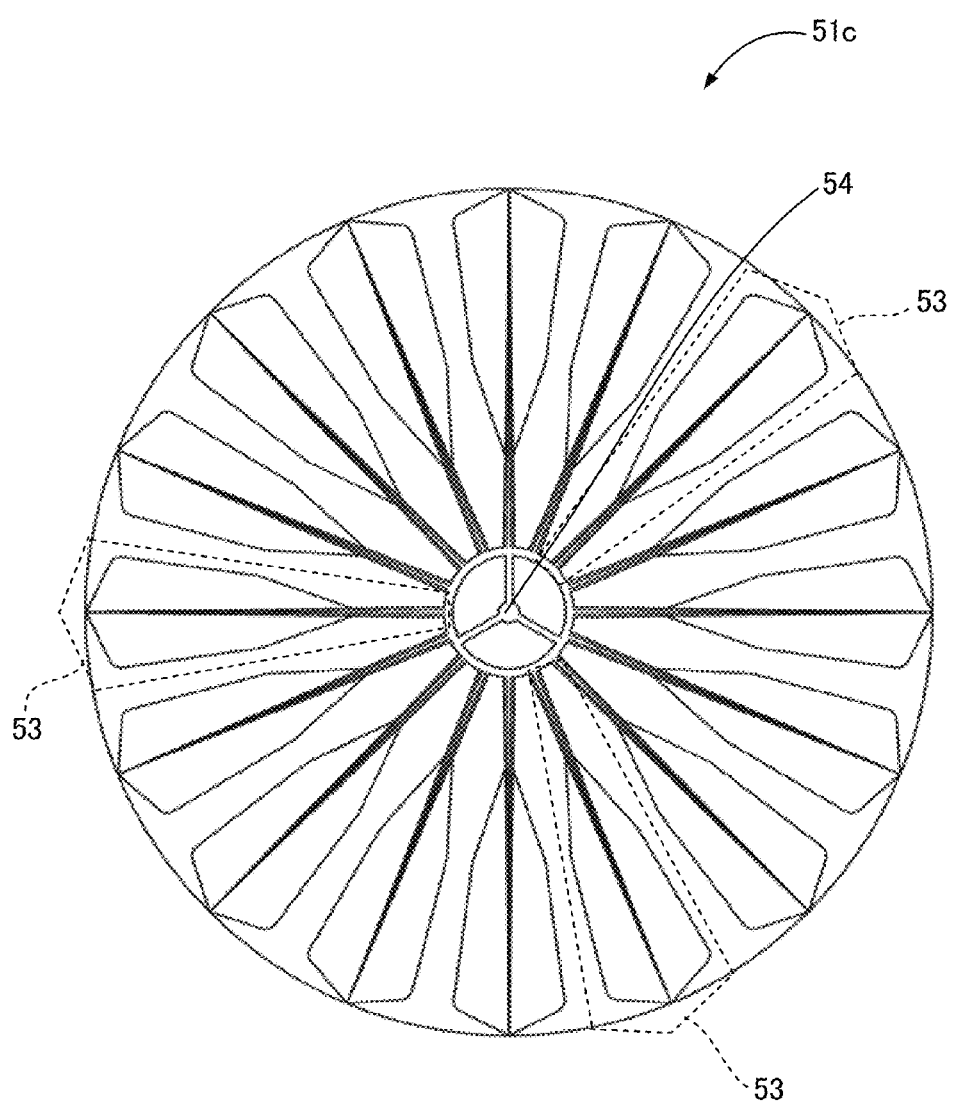
FIG. 21 shows a structure diagram of the die for integrally molding the artificial feathers according to the aforementioned embodiments.

In the above-described third and fourth embodiments, examples of molding the artificial feathers (10a, 10d) one by one were exemplified as the manufacturing methods of the artificial feathers (10a, 10d). It is a matter of course that a plurality of the artificial feathers (10a, 10d) can be molded at one time. FIG. 21 shows a planar view of the die 51c adapted for multiple-feather molding. Dies 53 corresponding to the multiple pieces of artificial feathers (10a, 10d) are radially arranged and a plurality pieces of primary molded products or secondary molded products can be molded at one time by providing a resin injection hole 54 at the center part of the mold.

<Material of Vane Portion>

The material of the vane portion is not limited to the aforementioned polyamide elastomer. Since thermoplastic resin having interconnecting bubbles therein can be expected to exhibit a similar performance to polyamide elastomer. For example, ionomer resin, polyester elastomer, polyolefin-based elastomer, polystyrene-based elastomer, and vinyl chloride-based elastomer may be adopted as the material of the vane portion.

<Reinforcing the Vane Portion>

The vane portion 12 requires to be lightweight as well as to have sufficient strength that can withstand a strong hit when being hit. For such reason, the artificial feathers (10, 10a to 10f) in the aforementioned embodiments and the modified examples may have a reinforcement material in a thin film form layered on the front face 13 or the back face 14 of the vane portion 12 by methods such as adhesion and welding.

Various materials may be given as the reinforcing material, however, it is preferable that the force for cutting (cutting strength) and the elongation ratio of the material until cutting (cutting elongation) is larger.

The following Table 3 shows the cutting strength and the cutting elongation when various reinforcing materials are layered on the vane portion 12.

TABLE 3

| REINFORCING MATERIAL | CUTTING STRENGTH (N) | CUTTING ELONGATION (%) |
| --- | --- | --- |
| VINYL ACETATE | 5.5 | 41.7 |
| METHOXYMETHYL NYLON | 7.7 | 81.4 |
| COPOLYMER NYLON | 7.7 | 17.9 |
| WATERBORNE POLYURETHANE | 8.3 | 141.3 |

Table 3 shows various resins as the reinforcing material. The resins are assumed to have its concentration with regard to the solvent adjusted so that the increase in weight of the initial vane portion 12 due to layering of the reinforcing material is 0.005 grams. And as shown in Table 3, it was found that waterborne polyurethane exhibited excellent cutting strength (N) and cutting elongation (%). Additionally, it can be expected that the burden on the environment during manufacturing the artificial feathers (10, 10a to 10d) can be relieved since waterborne polyurethane does not use organic solvents. Note that it is presumed that the reinforcing material is not limited to waterborne polyurethane and waterborne polyester, waterborne polyolefin, nylon-based emulsion, and acrylic-based emulsion having properties similar to this waterborne polyurethane can be applied.

Further, being an interconnecting bubble body, the reinforcing material may be impregnated in the vane portion 12 rather than layering the reinforcing material on the initial vane portion 12.

The cutting strength and the cutting elongation of the vane portion 12 with the reinforcing material impregnated is shown in following Table 4.

TABLE 4

| REINFORCING MATERIAL | CUTTING STRENGTH (N) | CUTTING ELONGATION (%) |
| --- | --- | --- |
| WATERBORNE POLYURETHANE | 8.5 | 143.6 |

Table 4 shows that cutting strength and cutting elongation equal to the case where waterborne polyurethane is layered on the vane portion 12 can be achieved. And it is presumed that in also this case, the reinforcing material is not limited to waterborne polyurethane and waterborne polyester, waterborne polyolefin, nylon-based emulsion, and acrylic-based emulsion can be applied.

INDUSTRIAL APPLICABILITY

The present invention can be applied to shuttlecocks used in badminton.

REFERENCE SIGNS LIST 1 artificial shuttlecock, 2 base portion, 3 string like member, 10, 10a-10f artificial feather, 12 vane portion, 20, 20c-20k rachis portion, 30 core portion, 31 side faces of core portion, 34 grooves, 35 temporary holdback portions, outer shell portion, 50a, 50b primary molded product, 51a, 51b first die, 51c die, 52a second die

The invention claimed is:

1. An artificial feather for a shuttlecock comprising:
a vane portion in a thin film form, corresponding to a vane, and a rachis portion in a bar form extending integrally and continuously from an upper tip end to a lower distal end, corresponding to a rachis, to imitate a natural feather,
the vane portion being made of thermoplastic resin having interconnecting bubbles therein, and having low specific gravity and low elasticity relative to the rachis portion,
the rachis portion being made of thermoplastic resin being fixed to the vane portion at a vane support portion, having the vane support portion set as an area that is fixed to the vane portion along the tip end to a bottom end of the vane portion, and having a calamus portion set as an area that protrudes to a lower side of the vane portion and spans from a bottom end of the vane support portion to the distal end, to correspond to a calamus of the natural feather.

2. The artificial feather for a shuttlecock according to claim 1, wherein
the thermoplastic resin that configures the vane portion is any one of polyamide elastomer, ionomer resin, polyester elastomer, polyolefin-based elastomer, polystyrene-based elastomer, and vinyl chloride-based elastomer.

3. The artificial feather for a shuttlecock according to claim 1, wherein
a thin film reinforcing material is layered on a front face or a back face of the vane portion.

4. The artificial feather for a shuttlecock according to claim 3, wherein
the reinforcing material is any one of waterborne polyurethane, waterborne polyester, waterborne polyolefin, nylon-based emulsion and acrylic-based emulsion.

5. The artificial feather for a shuttlecock according to claim 1, wherein
the vane portion is impregnated with a reinforcing material.

6. The artificial feather for a shuttlecock according to claim 5, wherein
the reinforcing material is any one of waterborne polyurethane, waterborne polyester, waterborne polyolefin, nylon-based emulsion and acrylic-based emulsion.

7. A shuttlecock comprising the artificial feather according to claim 1.

* * * * *